(12) United States Patent
Wang et al.

(10) Patent No.: US 12,063,348 B2
(45) Date of Patent: Aug. 13, 2024

(54) WEIGHTED SAMPLE BI-PREDICTION IN VIDEO CODING

(71) Applicants: Beijing Bytedance Network Technology Co., Ltd., Beijing (CN); Bytedance Inc., Los Angeles, CA (US)

(72) Inventors: Yang Wang, Beijing (CN); Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/691,910

(22) Filed: Mar. 10, 2022

(65) Prior Publication Data

US 2022/0201310 A1 Jun. 23, 2022

Related U.S. Application Data

(63) Continuation of application No. PCT/CN2020/114761, filed on Sep. 11, 2020.

(30) Foreign Application Priority Data

Sep. 13, 2019 (WO) ................ PCT/CN2019/105825

(51) Int. Cl.
*H04N 19/132* (2014.01)
*H04N 19/103* (2014.01)
(Continued)

(52) U.S. Cl.
CPC ......... *H04N 19/103* (2014.11); *H04N 19/105* (2014.11); *H04N 19/132* (2014.11);
(Continued)

(58) Field of Classification Search
None
See application file for complete search history.

(56) References Cited

U.S. PATENT DOCUMENTS 9,503,720 B2 11/2016 Chen et al.
9,554,150 B2 1/2017 Zhang et al.
(Continued)

FOREIGN PATENT DOCUMENTS

CN 104170381 A 11/2014
CN 107027038 A 8/2017
(Continued)

OTHER PUBLICATIONS

Bross et al. "Versatile Video Coding (Draft 6)" JVET-O2001-vE (Year: 2019).*

(Continued)

*Primary Examiner* — Mohammed Jebari
(74) *Attorney, Agent, or Firm* — Perkins Coie LLP

(57) ABSTRACT

A method of video processing is described. The method includes: deriving, for a conversion between a current block of a video and a coded representation of the video, a prediction block for the current block that is determined according to a tool in which weights are used to determine a weighted sum of two initial prediction blocks used to determine the prediction block; and performing the conversion using the prediction block; wherein the deriving includes: applying the weights to two intermediate prediction samples that respectively belong to the two initial prediction blocks to derive a final prediction sample; and performing a right shift operation for the final prediction (Continued)

sample, wherein the right shift operation is pbSample>>(shift1+3)), wherein pbSample represents the final prediction sample, shift1 is set equal to Max(2, 14−bitDepth); and determining the prediction block based on the final prediction sample.

20 Claims, 20 Drawing Sheets

(51) Int. Cl.

| | | |
|---|---|---|
| H04N 19/105 | (2014.01) | |
| H04N 19/137 | (2014.01) | |
| H04N 19/159 | (2014.01) | |
| H04N 19/176 | (2014.01) | |
| H04N 19/184 | (2014.01) | |
| H04N 19/186 | (2014.01) | |
| H04N 19/46 | (2014.01) | |
| H04N 19/50 | (2014.01) | |

(52) U.S. Cl.
CPC ......... *H04N 19/137* (2014.11); *H04N 19/159* (2014.11); *H04N 19/176* (2014.11); *H04N 19/184* (2014.11); *H04N 19/186* (2014.11); *H04N 19/46* (2014.11); *H04N 19/50* (2014.11)

(56) References Cited

U.S. PATENT DOCUMENTS

| | | |
|---|---|---|
| 10,708,605 B2 | 7/2020 | He et al. |
| 10,798,404 B2 | 10/2020 | Chuang et al. |
| 10,805,630 B2 | 10/2020 | Li et al. |
| 11,595,658 B2 | 2/2023 | Wang et al. |
| 2007/0036226 A1 | 2/2007 | Kim et al. |
| 2008/0310511 A1 | 12/2008 | Suzuki |
| 2010/0086052 A1 | 4/2010 | Park et al. |
| 2011/0170593 A1 | 7/2011 | Kim et al. |
| 2013/0243093 A1 | 9/2013 | Chen et al. |
| 2014/0079125 A1 | 3/2014 | Tanizawa et al. |
| 2015/0098503 A1* | 4/2015 | Pu ................. H04N 19/105 375/240.12 |
| 2015/0124872 A1 | 5/2015 | Zhou et al. |
| 2015/0264347 A1 | 9/2015 | Zhang et al. |
| 2016/0219261 A1 | 7/2016 | Chen et al. |
| 2017/0289566 A1 | 10/2017 | He et al. |
| 2018/0070105 A1 | 3/2018 | Jin et al. |
| 2018/0139440 A1 | 5/2018 | Kim et al. |
| 2018/0278958 A1 | 9/2018 | Hsiang |
| 2018/0288430 A1 | 10/2018 | Chen et al. |
| 2019/0230350 A1 | 7/2019 | Chen et al. |
| 2020/0336738 A1 | 10/2020 | Xiu et al. |
| 2020/0366928 A1 | 11/2020 | Liu et al. |
| 2021/0037258 A1 | 2/2021 | Zhang et al. |
| 2021/0211716 A1 | 7/2021 | Zhang et al. |
| 2021/0218985 A1 | 7/2021 | Liu et al. |
| 2021/0235073 A1 | 7/2021 | Liu et al. |
| 2021/0274213 A1 | 9/2021 | Xiu et al. |
| 2021/0289216 A1 | 9/2021 | Liu et al. |
| 2022/0007048 A1 | 1/2022 | He et al. |
| 2022/0014779 A1 | 1/2022 | Misra et al. |
| 2022/0060689 A1 | 2/2022 | Jang et al. |
| 2022/0078431 A1* | 3/2022 | Chujoh ................... H04N 19/52 |
| 2022/0103808 A1 | 3/2022 | Jang et al. |
| 2022/0103855 A1 | 3/2022 | Jang et al. |
| 2022/0103858 A1 | 3/2022 | Jang et al. |
| 2022/0159265 A1 | 5/2022 | Galpin et al. |
| 2022/0182614 A1* | 6/2022 | Jang ................. H04N 19/70 |
| 2022/0201314 A1 | 6/2022 | Wang et al. |

FOREIGN PATENT DOCUMENTS

| | | |
|---|---|---|
| CN | 107105263 A | 8/2017 |
| CN | 109587479 A | 4/2019 |
| CN | 109792534 A | 5/2019 |
| WO | 2007116551 A1 | 10/2007 |
| WO | 2014052982 A1 | 4/2014 |
| WO | 2018099269 A1 | 6/2018 |
| WO | 2019017694 A1 | 1/2019 |
| WO | 2019154417 A1 | 8/2019 |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

Chen et al. "Non-CE2.5: ATMVP Collocated Block Derivation from History-Based Candidate," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0515, 2019.

Chen et al. "Non-CE4: Simplification on SbTMVP," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-00163, 2019.

Deng et al. "Non-CE4: Cleanups on MVD Ranges," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0567, 2019.

He et al. "CE4-related: Encoder Speed-Up and Bug Fix for Generalized Bi-Prediction in BMS-2.1," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0296, 2018.

Henkel et al. "Non-CE4: Switched Half-Pel Interpolation Filter," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0309, 2019.

Su et al. "CE4-Related: Generalized Bi-Prediction Improvements," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0197, 2018.

Su et al. "CE4-related: Generalized Bi-Prediction Improvements Combined from JVET-L0197 and JVET-L0296," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0646, 2018.

Tsukuba et al. "CE8: Chroma Transform Skip (CE8-3.2)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0081, 2019.

https://vcgit.hhi.fraunhofer.de/jvet/VVCSoftware_VTM/tags/VTM-6.0.

International Search Report and Written Opinion from International Patent Application No. PCT/CN2020/114760 dated Dec. 2, 2020 (9 pages).

International Search Report and Written Opinion from International Patent Application No. PCT/CN2020/114761 dated Dec. 16, 2020 (11 pages).

International Search Report and Written Opinion from International Patent Application No. PCT/CN2020/114763 dated Dec. 3, 2020 (15 pages).

Non Final Office Action from U.S. Appl. No. 17/691,867 dated Jul. 12, 2022.

Dias et al. "CE10: CIIP using explicit signaling of weights (CE10-1.2)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0298, 2019.

Lim et al. "Editorial Cleanup for BCW (Bi-Prediction with CU-Level Weights)," Joint Video Experts Team (JVET) of ITU-T SG 16 WP 3 and ISO/IEC JTC 1/SC 29/WG 11 19th Meeting, by teleconference, Jun. 22-Jul. 1, 2020, document JVET-S0240, 2020.

Zhu et al. "Non-CE8: Adaptive Single/Dual Tree with IBC Simplification," Joint Video Experts Team (JVET) of ITU-T SG 16 WP 3

(56) References Cited

OTHER PUBLICATIONS and ISO/IEC JTC 1/SC 29/WG 11 15th Meeting, Gothenburg SE, Jul. 3-12, 2019 document JVET-O0258, 2019.
Extended European Search Report from European Patent Application No. 20862935.2 dated Nov. 3, 2022 (12 pages).
First Office Action from Chinese Patent Application No. 202080064505.8 mailed May 6, 2024.

* cited by examiner

1000

Deriving, based on a first weight table associated with a bi-prediction mode with a coding unit (CU)-level weight (BCW) process, a prediction sample for a current block, the first weight table being asymmetric — 1010

Performing, based on the prediction sample, a conversion between the current block and a bitstream representation of the current block — 1020

FIG. 10

1530 — Deriving, for a conversion between a current block of a video and a coded representation of the video, a prediction block for the current block that is determined according to a bi-directional coding unit level weighting (BCW) tool in which weights are used to determine a weighted sum of two initial prediction blocks used to determine the prediction block 1534 — Performing the conversion using the prediction block

WEIGHTED SAMPLE BI-PREDICTION IN VIDEO CODING

CROSS REFERENCE TO RELATED APPLICATIONS

This application is a continuation of International Patent Application No. PCT/CN2020/114761, filed on Sep. 11, 2020, which claims the priority to and benefit of International Patent Application No. PCT/CN2019/105825, filed on Sep. 13, 2019. For all purposes under the law, the entire disclosure of the aforementioned applications are incorporated by reference as part of the disclosure of this application.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and specifically, to collocated motion vector in video processing are described. The described methods may be applied to both the existing video coding standards (e.g., High Efficiency Video Coding (HEVC)) and future video coding standards (e.g., Versatile Video Coding (VVC)) or codecs.

In one exemplary aspect, a method of video processing is disclosed. The method includes making a first determination about whether a collocated video block of a video block of a video is coded using an inter coding mode or a non-inter coding mode; making a second determination, based on the first determination, about availability of motion vectors of the collocated video block or a mode of derivation of motion vectors for the collocated video block; and performing a conversion between the video block and a coded representation of the video based on the second determination.

In another exemplary aspect, a method of video processing is disclosed. The method includes determining, for a conversion between a video block of a video and a coded representation of the video, one or more collocated motion vectors based on a reference index or a reference list of a collocated video block of the video block; and performing the conversion based on the determining.

In yet another exemplary aspect, a method of video processing is disclosed. The method includes deriving, for a conversion between a current block of a video and a coded representation of the video, a prediction block for the current block that is determined according to a bi-directional coding unit level weighting (BCW) tool in which weights are used to determine a weighted sum of two initial prediction blocks used to determine the prediction block; and performing the conversion using the prediction block, wherein the deriving of the prediction block comprises: applying the weights to two intermediate prediction samples that respectively belong to the two initial prediction blocks to derive a final prediction sample; and performing a right shift operation for the final prediction sample to convert a bit depth of the final prediction sample, wherein the right shift operation is pbSample>> (shift1+3)), wherein pbSample represents the final prediction sample, shift1 is set equal to Max(2, 14−bitDepth); and determining the prediction block based on the final prediction sample.

In yet another exemplary aspect, a method of video processing is disclosed. The method includes deriving, for a conversion between a current block of a video and a coded representation of the video, a prediction block for the current block that is determined according to a bi-directional coding unit level weighting (BCW) tool in which weights are used to determine a weighted sum of two initial prediction blocks used to determine the prediction block; and performing the conversion using the prediction block; wherein the deriving of the prediction block comprises: applying the weights to two intermediate prediction sample that respectively belong to the two initial prediction blocks to derive a final prediction sample; and adding an offset to the final prediction sample, wherein the offset is 1<<(shift1+2), wherein shift1 is set equal to Max(2, 14−bitDepth); and determining the prediction block based on the final prediction sample.

In yet another exemplary aspect, a method of video processing is disclosed. The method includes deriving, for a conversion between a current block of a video and a coded representation of the video, a motion vector difference for a merge mode motion vector predictor for the current block according to a rule; and performing the conversion based on the deriving, wherein the rule specifies whether to clip the motion vector difference to a same range as a range used for clipping motion vectors.

In yet another exemplary aspect, a method of video processing is disclosed. The method includes deriving, for a conversion between a current block of a video and a coded representation of the video, a prediction block for the current block that is determined according to a bi-directional coding unit level weighting (BCW) tool in which weights are used to determine a weighted sum of two initial prediction blocks used to determine the prediction block, wherein at least one of the weights belongs to a weight table, wherein the weight table is organized according to a rule; and performing the conversion using the prediction block, wherein the rule specifies that entries of the weight table are non-monotonically increasing.

In yet another exemplary aspect, a method of video processing is disclosed. The method includes deriving, for a conversion between a current block of a video and a coded representation of the video, a prediction block for the current block that is determined according to a bi-directional coding unit level weighting (BCW) tool in which weights are used to determine a weighted sum of two initial prediction blocks used to determine the prediction block, wherein at least one of the weights belongs to a weight table, and the weight table is selected from multiple weight tables; and performing the conversion using the prediction block.

In yet another exemplary aspect, a method of video processing is disclosed. The method includes deriving, for a conversion between a current block of a video and a coded representation of the video, a prediction block for the current block that is determined according to a bi-directional coding unit level weighting (BCW) tool in which weights are used to determine a weighted sum of two initial prediction blocks used to determine the prediction block; and performing the conversion using the prediction block, wherein the deriving of the prediction block comprises: converting an intermediate prediction sample to a first bit depth; applying the weights to the intermediate prediction sample to derive a final prediction sample; and converting the final prediction sample to a second bit depth.

In yet another exemplary aspect, a method of video processing is disclosed. The method includes deriving, for a conversion between a current block of a video and a coded representation of the video, a prediction block for the current block that is determined according to a bi-directional coding unit level weighting (BCW) tool in which a first weight and a second weight are used to determine a weighted sum of two initial prediction blocks used to determine the prediction block, wherein at least one of the first weight and the second weight is included in a weight table, wherein the weight table is organized according to a rule; and performing the conversion using the prediction block, wherein the rule specifies that the weight table is asymmetric.

In yet another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 10 is a flowchart for yet another example of a video processing method.

FIGS. 15A to 15E are flowcharts of example methods of video processing based on some implementations of the disclosed technology.

DETAILED DESCRIPTION

Figure 1:
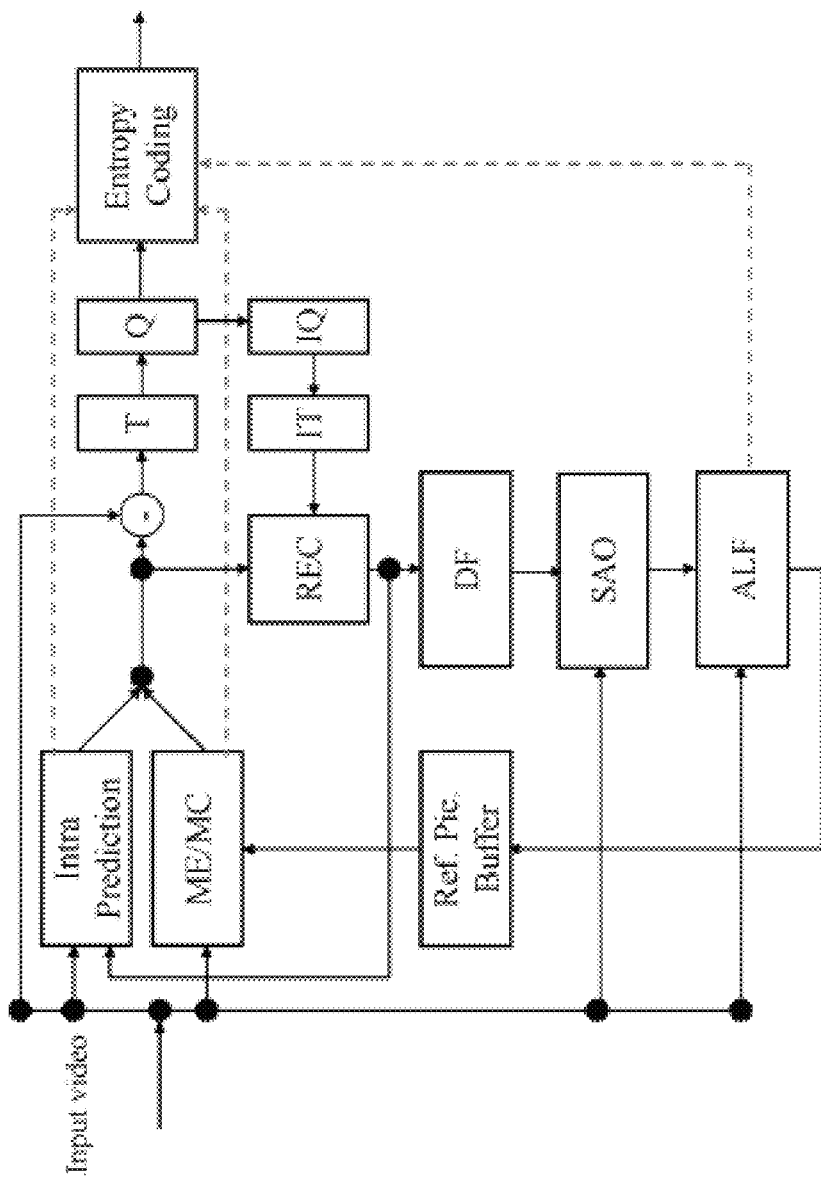
FIG. 1 shows a block diagram of an example encoder.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is related to collocated motion vectors and other coding tools. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1 4:4:4

Each of the three Y'CbCr components have the same sample rate, thus there is no chroma subsampling. This scheme is sometimes used in high-end film scanners and cinematic post production.

2.1.2 4:2:2

The two chroma components are sampled at half the sample rate of luma: the horizontal chroma resolution is halved. This reduces the bandwidth of an uncompressed video signal by one-third with little to no visual difference.

2.1.3 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

- In MPEG-2, Cb and Cr are cosited horizontally. Cb and Cr are sited between pixels in the vertical direction (sited interstitially).
- In JPEG/JFIF, H.261, and MPEG-1, Cb and Cr are sited interstitially, halfway between alternate luma samples.
- In 4:2:0 DV, Cb and Cr are co-sited in the horizontal direction. In the vertical direction, they are co-sited on alternating lines.

2.2 Coding Flow of a Typical Video Codec

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signalling the offsets and filter coefficients. ALF is located at the last processing stage of each picture and can be regarded as a tool trying to catch and fix artifacts created by the previous stages.

2.3 Intra Mode Coding with 67 Intra Prediction Modes

To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Figure 2:
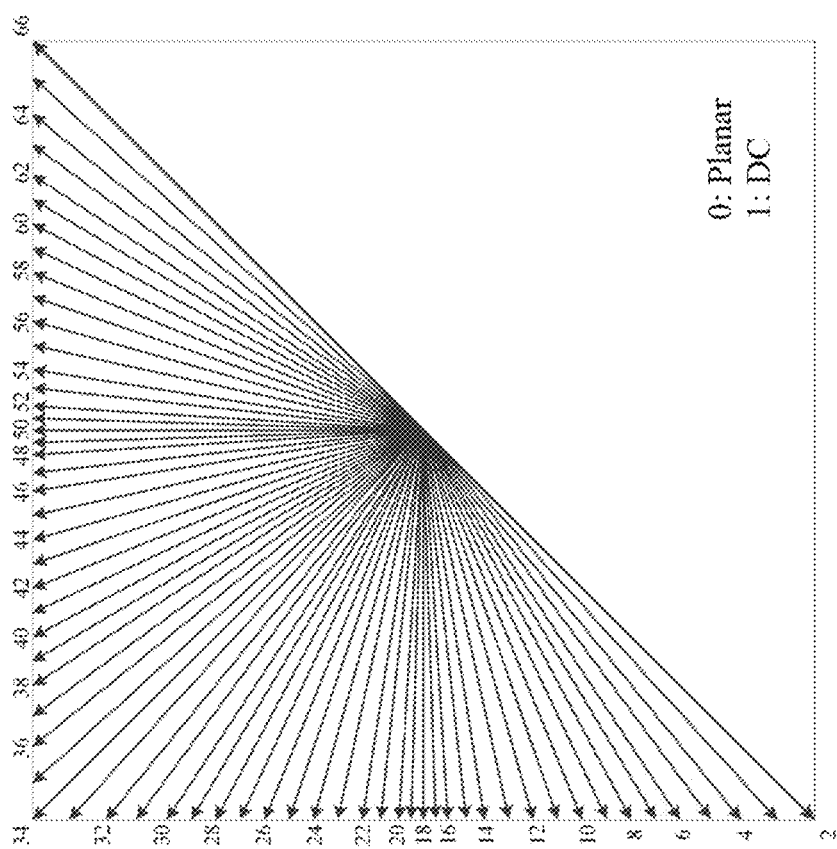
FIG. 2 shows an example of 67 intra prediction modes.

Conventional angular intra prediction directions are defined from 45 degrees to −135 degrees in clockwise direction as shown in FIG. 2. In VTM6, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

2.4 Inter Prediction

For each inter-predicted CU, motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

2.5 Intra Block Copy (IBC)

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode is signalled with a flag and it can be signaled as IBC AMVP mode or IBC skip/merge mode as follows:

- IBC skip/merge mode: a merge candidate index is used to indicate which of the block vectors in the list from neighboring candidate IBC coded blocks is used to predict the current block. The merge list consists of spatial, HMVP, and pairwise candidates.
- IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

2.6 Palette Mode

For palette mode signaling, the palette mode is coded as a prediction mode for a coding unit, i.e., the prediction modes for a coding unit can be MODE_INTRA, MODE_INTER, MODE_IBC and MODE_PLT. If the palette mode is utilized, the pixels values in the CU are represented by a small set of representative colour values. The set is referred to as the palette. For pixels with values close to the palette colors, the palette indices are signalled. For pixels with values outside the palette, the pixel is denoted with an escape symbol and the quantized pixel values are signaled directly.

To decode a palette encoded block, the decoder needs to decode palette colors and indices. Palette colors are described by a palette table and encoded by palette table coding tools. An escape flag is signaled for each CU to indicate if escape symbols are present in the current CU. If escape symbols are present, the palette table is augmented by one and the last index is assigned to the escape mode. Palette indices of all pixels in a CU form a palette index map and are encoded by palette index map coding tools.

For coding of the palette table, a palette predictor is maintained. The predictor is initialized at the beginning of each slice where predictor is reset to 0. For each entry in the palette predictor, a reuse flag is signalled to indicate whether it is part of the current palette. The reuse flags are sent using run-length coding of zeros. After this, the number of new palette entries are signalled using exponential Golomb code of order 0. Finally, the component values for the new palette entries are signalled. After encoding the current CU, the palette predictor will be updated using the current palette, and entries from the previous palette predictor which are not reused in the current palette will be added at the end of new palette predictor until the maximum size allowed is reached (palette stuffing).

Figure 3:
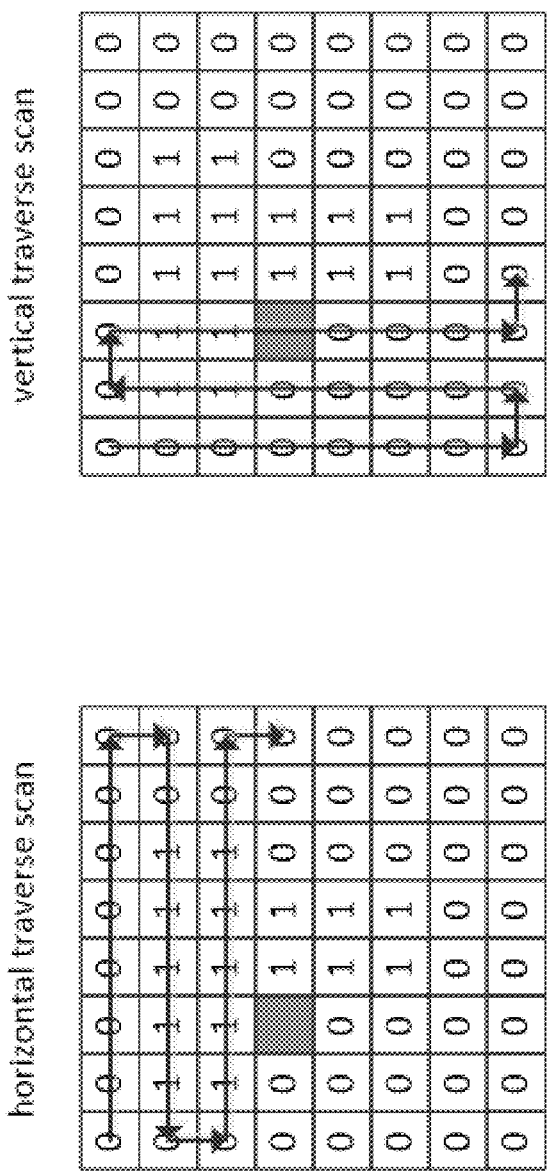
FIG. 3 shows an example of horizontal and vertical traverse scans.

For coding the palette index map, the indices are coded using horizontal and vertical traverse scans as shown in FIG. 3. The scan order is explicitly signalled in the bitstream using the palette_transpose_flag.

The palette indices are coded using two main palette sample modes: 'INDEX' and 'COPY_ABOVE'. The mode is signalled using a flag except for the top row when horizontal scan is used, the first column when the vertical scan is used, or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number pixels that are coded using the same mode.

The encoding order for index map is as follows: First, the number of index values for the CU is signalled. This is followed by signalling of the actual index values for the entire CU using truncated binary coding. Both the number of indices as well as the index values are coded in bypass mode. This groups the index-related bypass bins together. Then the palette mode (INDEX or COPY_ABOVE) and run are signalled in an interleaved manner. Finally, the component escape values corresponding to the escape samples for the entire CU are grouped together and coded in bypass mode. An additional syntax element, last_run_type_flag, is signalled after signalling the index values. This syntax element, in conjunction with the number of indices, eliminates the need to signal the run value corresponding to the last run in the block.

In VTM5.0, dual tree is enabled for I slice which separate the coding unit partitioning for Luma and Chroma. Hence, in this proposal, palette is applied on Luma (Y component) and Chroma (Cb and Cr components) separately. If dual tree is disabled, palette will be applied on Y, Cb, Cr components jointly, same as in HEVC palette.

2.7 Temporal Motion Vector Prediction (TMVP) in VVC

Figure 4:
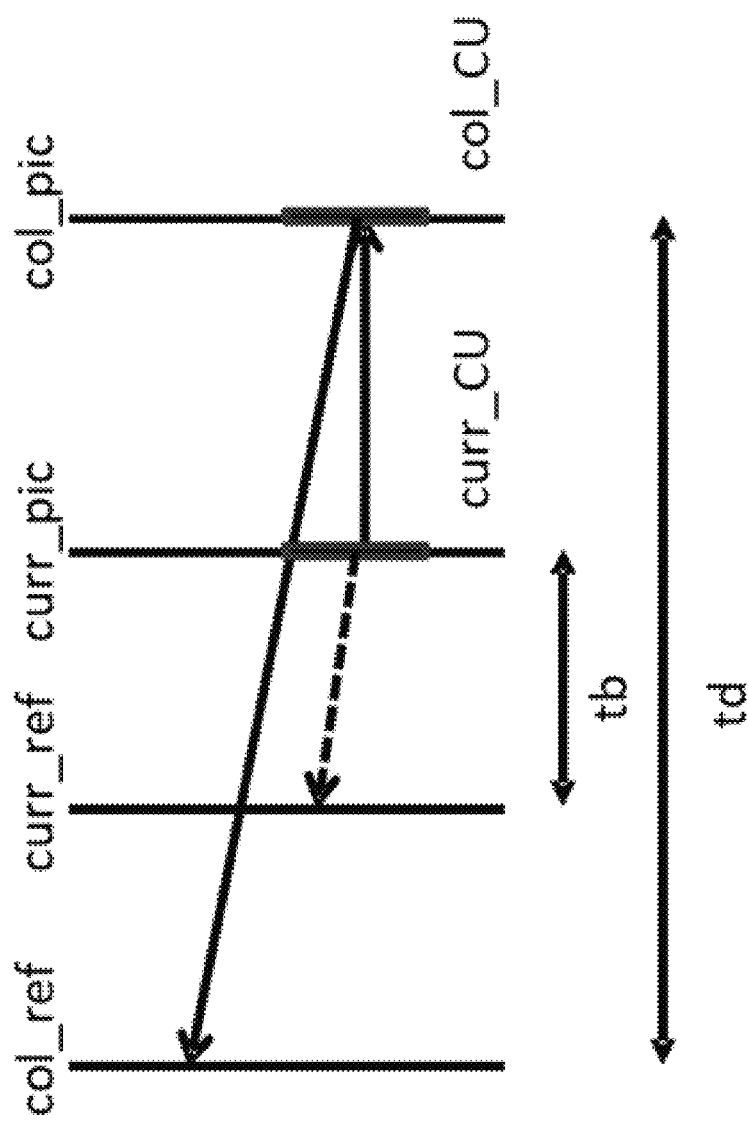
FIG. 4 shows an example of motion vector scaling for temporal merge candidates.

In the derivation of this temporal merge candidate, a scaled motion vector is derived based on co-located CU belonging to the collocated referenncee picture. The reference picture list to be used for derivation of the co-located CU is explicitly signalled in the slice header. The scaled motion vector for temporal merge candidate is obtained as illustrated by the dotted line in FIG. 4, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 5:
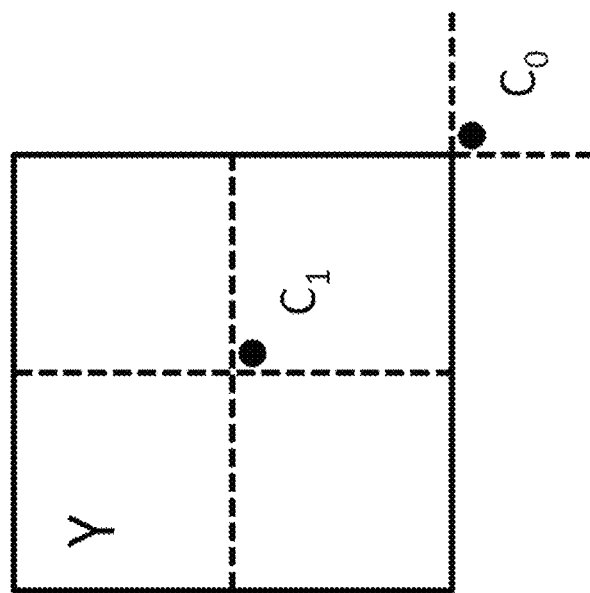
FIG. 5 shows candidate positions for a temporal merge candidate.

The position for the temporal candidate is selected between candidates $C_0$ and $C_1$, as depicted in FIG. 5. If CU at position $C_0$ is not available, is intra coded, or is outside of the current row of CTUs, position $C_1$ is used. Otherwise, position $C_0$ is used in the derivation of the temporal merge candidate.

2.8 Subblock-Based Temporal Motion Vector Prediction (SbTMVP) in VVC

VTM supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in the following two main aspects:

1. TMVP predicts motion at CU level but SbTMVP predicts motion at sub-CU level;
2. Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 6A:
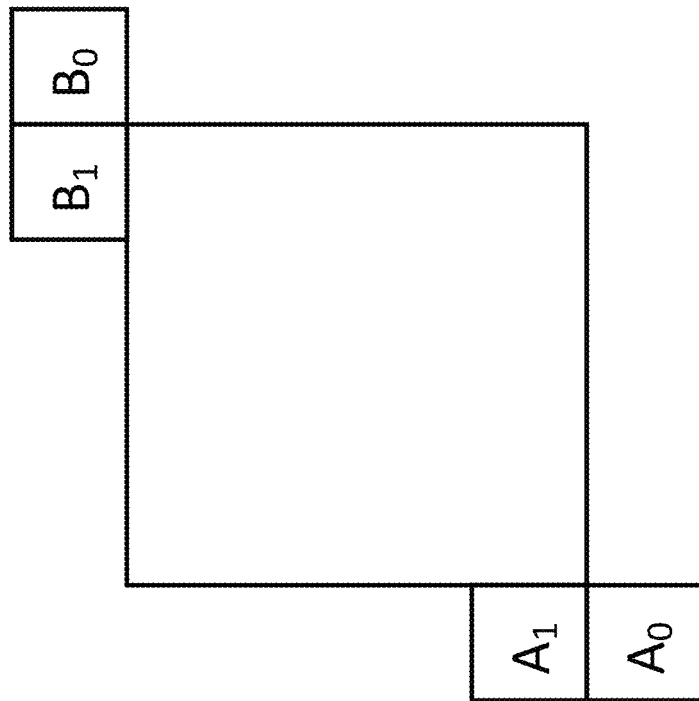
FIG. 6A shows an example of spatial neighboring blocks used by Alternative Temporal Motion Vector Prediction (ATMVP).

The SbTVMP process is illustrated in FIG. 6. SbTMVP predicts the motion vectors of the sub-CUs within the current CU in two steps. In the first step, the spatial neighbor A1 in FIG. 6A is examined. If A1 has a motion vector that uses the collocated picture as its reference picture, this motion vector is selected to be the motion shift to be applied. If no such motion is identified, then the motion shift is set to (0, 0).

Figure 6B:
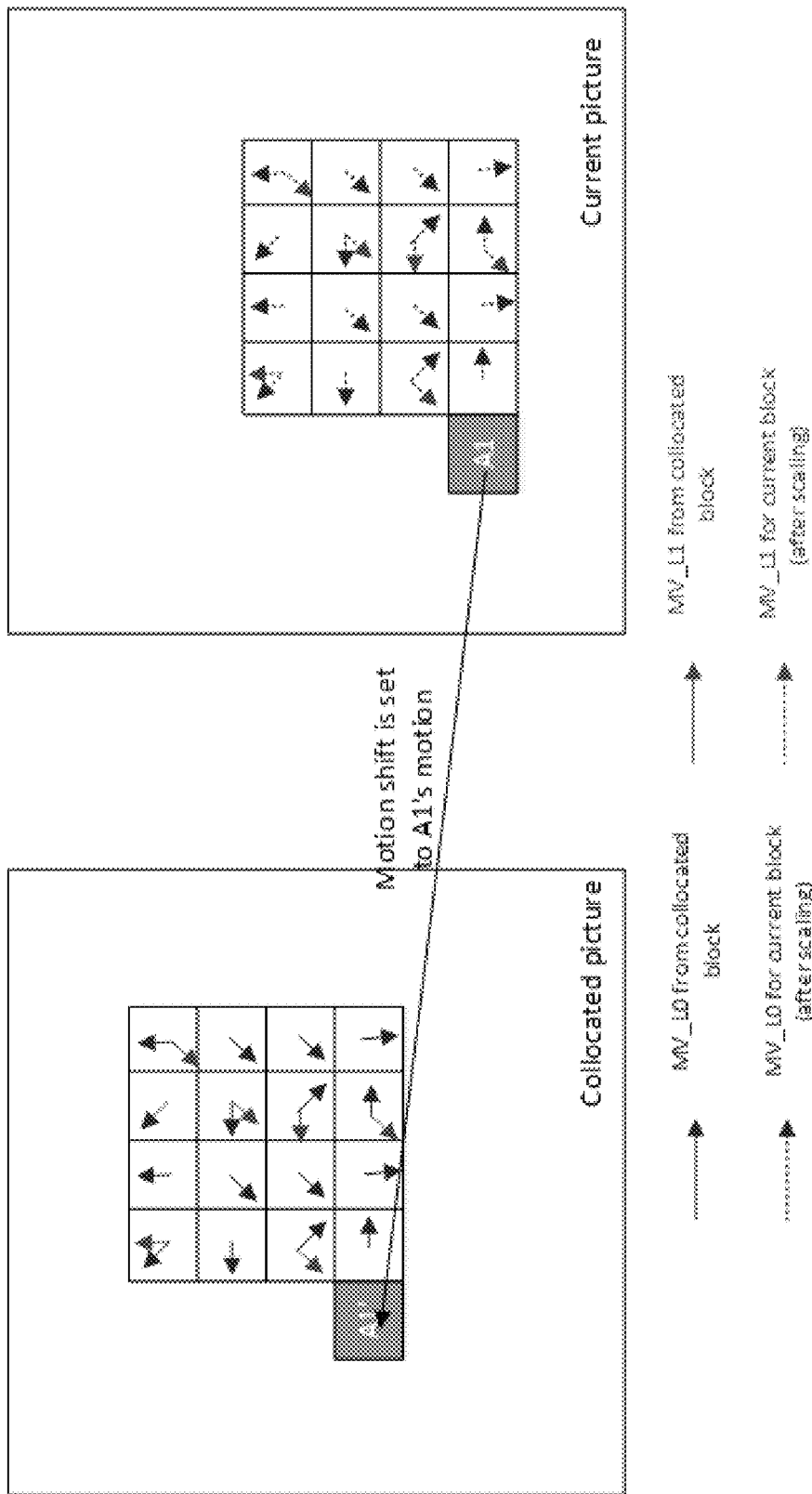
FIG. 6B shows an example of deriving sub-CU motion field.

In the second step, the motion shift identified in Step 1 is applied (i.e. added to the current block's coordinates) to obtain sub-CU-level motion information (motion vectors and reference indices) from the collocated picture as shown in FIG. 6B. The example in FIG. 6B assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In VTM6, a combined sub-block based merge list which contains both SbTVMP candidate and affine merge candidates is used for the signalling of sub-block based merge mode. The SbTVMP mode is enabled/disabled by a sequence parameter set (SPS) flag. If the SbTMVP mode is enabled, the SbTMVP predictor is added as the first entry of the list of sub-block based merge candidates, and followed by the affine merge candidates. The size of sub-block based merge list is signalled in SPS and the maximum allowed size of the sub-block based merge list is 5 in VTM6.

The sub-CU size used in SbTMVP is fixed to be 8×8, and as done for affine merge mode, SbTMVP mode is only applicable to the CU with both width and height are larger than or equal to 8.

The encoding logic of the additional SbTMVP merge candidate is the same as for the other merge candidates, that is, for each CU in P or B slice, an additional RD check is performed to decide whether to use the SbTMVP candidate.

Description of TMVP and SbTMVP in Working Draft
8.5.2.11 Derivation Process for Temporal Luma Motion Vector Prediction
Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples,
  a reference index refIdxLX, with X being 0 or 1.
Outputs of this process are:
  the motion vector prediction mvLXCol in 1/16 fractional-sample accuracy,
  the availability flag availableFlagLXCol.
The variable currCb specifies the current luma coding block at luma location (xCb, yCb).
The variables mvLXCol and availableFlagLXCol are derived as follows:
  If slice_temporal_mvp_enabled_flag is equal to 0 or (cbWidth*cbHeight) is less than or equal to 32, both components of mvLXCol are set equal to 0 and availableFlagLXCol is set equal to 0.
  Otherwise (slice_temporal_mvp_enabled_flag is equal to 1), the following ordered steps apply:
    1. The bottom right collocated motion vector and the bottom and right boundary sample locations are derived as follows:

$$xColBr = xCb + cbWidth \quad (8\text{-}421)$$

$$yColBr = yCb + cbHeight \quad (8\text{-}422)$$

rightBoundaryPos=subpic_treated_as_pic_flag[SubPicIdx]?SubPicRightBoundaryPos:
pic_width_in_luma_samples−1 (8-423)

botBoundaryPos=subpic_treated_as_pic_flag[SubPicIdx]?SubPicBotBoundaryPos:pic_height_in_luma_samples−1 (8-424)

If yCb>>Ctb Log 2SizeY is equal to yColBr>>Ctb Log 2SizeY, yColBr is less than or equal to botBoundaryPos and xColBr is less than or equal to rightBoundaryPos, the following applies:
      The variable colCb specifies the luma coding block covering the modified location given by ((xColBr>>3)<<3, (yColBr>>3)<<3) inside the collocated picture specified by ColPic.
      The luma location (xColCb, yColCb) is set equal to the top-left sample of the collocated luma coding block specified by colCb relative to the top-left luma sample of the collocated picture specified by ColPic.
      The derivation process for collocated motion vectors as specified in clause 8.5.2.12 is invoked with currCb, colCb, (xColCb, yColCb), refIdxLX and sbFlag set equal to 0 as inputs, and the output is assigned to mvLXCol and availableFlagLXCol.
    Otherwise, both components of mvLXCol are set equal to 0 and availableFlagLXCol is set equal to 0.
    2. When availableFlagLXCol is equal to 0, the central collocated motion vector is derived as follows:

$$xColCtr = xCb + (cbWidth >> 1) \quad (8\text{-}425)$$

$$yColCtr = yCb + (cbHeight >> 1) \quad (8\text{-}426)$$

The variable colCb specifies the luma coding block covering the modified location given by ((xColCtr>>3)<<3, (yColCtr>>3)<<3) inside the collocated picture specified by ColPic.
    The luma location (xColCb, yColCb) is set equal to the top-left sample of the collocated luma coding block specified by colCb relative to the top-left luma sample of the collocated picture specified by ColPic.
    The derivation process for collocated motion vectors as specified in clause 8.5.2.12 is invoked with currCb, colCb, (xColCb, yColCb), refIdxLX and sbFlag set equal to 0 as inputs, and the output is assigned to mvLXCol and availableFlagLXCol.

8.5.2.12 Derivation Process for Collocated Motion Vectors
Inputs to this process are:
  a variable currCb specifying the current coding block,
  a variable colCb specifying the collocated coding block inside the collocated picture specified by ColPic,
  a luma location (xColCb, yColCb) specifying the top-left sample of the collocated luma coding block specified by colCb relative to the top-left luma sample of the collocated picture specified by ColPic,
  a reference index refIdxLX, with X being 0 or 1,
  a flag indicating a subblock temporal merging candidate sbFlag.
Outputs of this process are:
  the motion vector prediction mvLXCol in 1/16 fractional-sample accuracy,
  the availability flag availableFlagLXCol.
The variable currPic specifies the current picture.
The arrays predFlagL0Col[x][y], mvL0Col[x][y] and refIdxL0Col[x][y] are set equal to PredFlagL0[x][y], MvDmvrL0[x][y] and RefIdxL0[x][y], respectively, of the collocated picture specified by ColPic, and the arrays predFlagL1Col[x][y], mvL1Col[x][y] and refIdxL1Col[x][y] are set equal to PredFlagL1[x][y], MvDmvrL1[x][y] and RefIdxL1[x][y], respectively, of the collocated picture specified by ColPic.
The variables mvLXCol and availableFlagLXCol are derived as follows:

*If colCb is coded in an intra or IBC prediction mode, both components of mvLXCol are set equal to 0 and available FlagLXCol is set equal to 0.*

*Otherwise, the motion vector mvCol, the reference index refIdxCol and the reference list identifier listCol are derived as follows:*

2.8.1 Derivation for Collocated Motion Vectors when colCb is Coded in an Inter Block If sbFlag is equal to 0, availableFlagLXCol is set to 1 and the following applies:

If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.

Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.

Otherwise (predFlagL0Col[xColCb][yColCb] is equal to 1 and predFlagL1Col[xColCb][yColCb] is equal to 1), the following assignments are made:

If NoBackwardPredFlag is equal to 1, mvCol, refIdxCol and listCol are set equal to mvLXCol[xColCb][yColCb], refIdxLXCol[xColCb][yColCb] and LX, respectively.

Otherwise, mvCol, refIdxCol and listCol are set equal to mvLNCol[xColCb][yColCb], refIdxLNCol[xColCb][yColCb] and LN, respectively, with N being the value of collocated_from_l0_flag.

Otherwise (sbFlag is equal to 1), the following applies:

If PredFlagLXCol[xColCb][yColCb] is equal to 1, mvCol, refIdxCol, and listCol are set equal to mvLXCol[xColCb][yColCb], refIdxLXCol[xColCb][yColCb], and LX, respectively, availableFlagLXCol is set to 1.

Otherwise (PredFlagLXCol[xColCb][yColCb] is equal to 0), the following applies:

If NoBackwardPredFlag is equal to 1 and PredFlagLYCol[xColCb][yColCb] is equal to 1, mvCol, refIdxCol, and listCol are set to mvLYCol[xColCb][yColCb], refIdxLYCol[xColCb][yColCb] and LY, respectively, with Y being equal to !X where X being the value of X this process is invoked for. availableFlagLXCol is set equal to 1.

Otherwise, both components of mvLXCol are set equal to 0 and availableFlagLXCol is set equal to 0.

When availableFlagLXCol is equal to TRUE, mvLXCol and availableFlagLXCol are derived as follows:

If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.

Otherwise, the variable availableFlagLXCol is set equal to 1, refPicList[listCol][refIdxCol] is set to be the picture with reference index refIdxCol in the reference picture list listCol of the slice containing coding block colCb in the collocated picture specified by ColPic, and the following applies:

$$colPocDiff = DiffPicOrderCnt(ColPic, refPicList[listCol][refIdxCol]) \quad (8\text{-}427)$$

$$currPocDiff = DiffPicOrderCnt(currPic, RefPicList[X][refIdxLX]) \quad (8\text{-}428)$$

The temporal motion buffer compression process for collocated motion vectors as specified in clause 8.5.2.15 is invoked with mvCol as input, and the modified mvCol as output.

If RefPicList[X][refIdxLX] is a long-term reference picture, or colPocDiff is equal to currPocDiff, mvLXCol is derived as follows:

$$mvLXCol = mvCol \quad (8\text{-}429)$$

Otherwise, mvLXCol is derived as a scaled version of the motion vector mvCol as follows:

$$tx = (16384 + (Abs(td) >> 1))/td \quad (8\text{-}430)$$

$$distScaleFactor = Clip3(-4096, 4095, (tb*tx+32)>>6) \quad (8\text{-}431)$$

$$mvLXCol = Clip3(-131072, 131071, (distScaleFactor*mvCol+128-(distScaleFactor*mvCol>=0))>>8)) \quad (8\text{-}432)$$

where td and tb are derived as follows:

$$td = Clip3(-128, 127, colPocDiff) \quad (8\text{-}433)$$

$$tb = Clip3(-128, 127, currPocDiff) \quad (8\text{-}434)$$

2.9 Bi-Prediction with CU-Level Weight (BCW)

In HEVC, the bi-prediction signal is generated by averaging two prediction signals obtained from two different reference pictures and/or using two different motion vectors. In VTM6, the bi-prediction mode is extended beyond simple averaging to allow weighted averaging of the two prediction signals.

$$P_{bi\text{-}pred} = ((8-w)*P_0 + w*P_1 + 4) >> 3 \quad (3\text{-}19)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. Weighted averaging bi-prediction is only applied to CUs with 256 or more luma samples (i.e., CU width times CU height is greater than or equal to 256). For low-delay pictures, all 5 weights are used. For non-low-delay pictures, only 3 weights ($w \in \{3, 4, 5\}$) are used.

At the encoder, fast search algorithms are applied to find the weight index without significantly increasing the encoder complexity. These algorithms are summarized as follows. For further details readers are referred to the VTM software and document JVET-L0646. When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This can be applied to both normal merge mode and inherited affine merge mode. For constructed affine merge mode, the affine motion information is constructed based on the motion information of up to 3 blocks. The following process is used to derive the BCW index for a CU using the constructed affine merge mode.

1. Divide the range of BCW index {0,1,2,3,4} into three groups {0},{1,2,3} and {4}. If all of the control point's BCW indices are from the same group, the BCW index is derived as in the step 2; otherwise, the BCW index is set to 2.

If at least two control points have the same BCW index, then this BCW index value is assigned to the candidate; else, the BCW index of the current constructed candidate is set to 2.

2.10 Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is signaled right after sending a skip flag and merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The merge candidate flag is signalled to specify which one is used.

Figure 7:
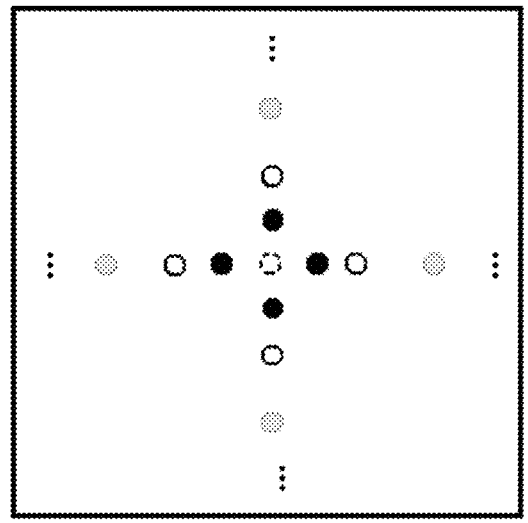
FIG. 7 shows an example of a search point for the merge with motion vector differences (MMVD) mode.
Figure 7:
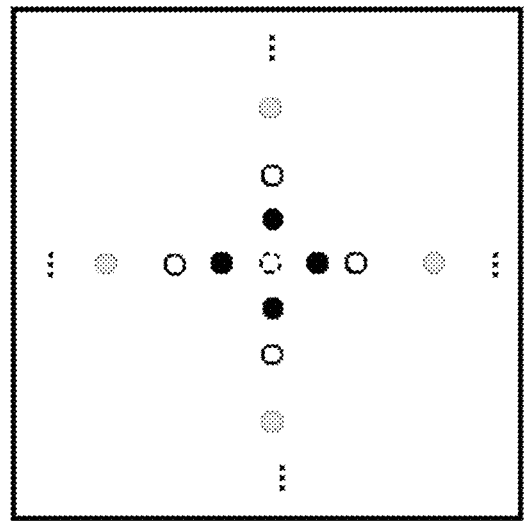

Distance index specifies motion magnitude information and indicate the pre-defined offset from the starting point. As shown in FIG. 7, an offset is added to either horizontal component or vertical component of starting MV. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

Direction index represents the direction of the MVD relative to the starting point. The direction index can represent of the four directions as shown in Table 2. It's noted that the meaning of MVD sign could be variant according to the information of starting MVs. When the starting MVs is an un-prediction MV or bi-prediction MVs with both lists point to the same side of the current picture (i.e. POCs of two references are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

2.11 Alternative Luma Half-Pel Interpolation Filters

In JVET-N0309, alternative half-pel interpolation filters are proposed.

The switching of the half-pel luma interpolation filter is done depending on the motion vector accuracy. In addition to the existing quarter-pel, full-pel, and 4-pel AMVR modes, a new half-pel accuracy AMVR mode is introduced. Only in case of half-pel motion vector accuracy, an alternative half-pel luma interpolation filter can be selected.

2.11.1 Half-pel AMVR Mode

An additional AMVR mode for non-affine non-merge inter-coded CUs is proposed which allows signaling of motion vector differences at half-pel accuracy. The existing AMVR scheme of the current VVC draft is extended straightforward in the following way: Directly following the syntax element amvr_flag, if amvr_flag==1, there is a new context-modeled binary syntax element hpel_amvr_flag which indicates usage of the new half-pel AMVR mode if hpel_amvr_flag==1. Otherwise, i.e. if hpel_amvr_flag==0, the selection between full-pel and 4-pel AMVR mode is indicated by the syntax element amvr_precision_flag as in the current VVC draft.

2.11.2 Alternative Luma Half-Pel Interpolation Filters

For a non-affine non-merge inter-coded CU which uses half-pel motion vector accuracy (i.e., the half-pel AMVR mode), a switching between the HEVC/VVC half-pel luma interpolation filter and one or more alternative half-pel interpolation is made based on the value of a new syntax element if_idx. The syntax element if_idx is only signaled in case of half-pel AMVR mode. In case of skip/merge mode using a spatial merging candidate, the value of the syntax element if_idx is inherited from the neighbouring block.

2.11.2.1 Test 1: One Alternative Half-Pel Interpolation Filter

In this test case, there is one 6-tap interpolation filter as an alternative to the ordinary HEVC/VVC half-pel interpolation filter. The following table shows the mapping between the value of the syntax element if_idx and the selected half-pel luma interpolation filter:

| if_idx | Binarization | Filter | Interpolation filter coefficients |
|---|---|---|---|
| 0 | 0 | Gauss (6-tap) | [0, 3, 9, 20, 20, 9, 3, 0] |
| 1 | 1 | HEVC/VVC (8-tap) | [−1, 4, −11, 40, 40, −11, 4, −1] |

2.11.2.1 Test 2: Two Alternative Half-Pel Interpolation Filters

In this test case, there are two 8-tap interpolation filters as an alternative to the ordinary HEVC/VVC half-pel interpolation filter. The following table shows the mapping between the value of the syntax element if_idx and the selected half-pel luma interpolation filter:

| if_idx | Binarization | Filter | Interpolation filter coefficients |
|---|---|---|---|
| 0 | 0 | Filter 1 (8-tap) | [3, 6, 10, 13, 13, 10, 6, 3] |
| 1 | 10 | Filter 2 (8-tap) | [−1, −1, 9, 25, 25, 9, −1, −1] |
| 2 | 11 | HEVC/VVC (8-tap) | [−1, 4, −11, 40, 40, −11, 4, −1] | amvr_precision_idx is signalled to indicate whether the current CU employs 1/2-pel, 1-pel or 4-pel MV precision. There are 2 bins to be coded.

hpel_if_idx is signalled to indicate whether the default half-pel interpolation filter or alternative half-pel interpolation filters are used. When 2 alternative half-pel interpolation filters are used, there are 2 bins to be coded.

3. Drawbacks of Existing Implementations

The current design of derivation of collocated motion vectors in inter prediction has the following problems:

1. The derivation of the collocated motion vectors in TMVP and SbTMVP depends on prediction mode of the collocated coding block. In current VVC, If the collocated coding block is coded in an intra or IBC prediction mode, the collocated motion vectors are set equal to zero motion vector. Therefore, even the collocated block is palette coded, it may still return a collocated motion vector which is undefined since there is no motion vector associated with a palette prediction mode.
2. The derivation of weighted sample prediction may not be efficient in BCW.
3. In current VVC, MV is clipped to 18 bits. However, the merge motion vector difference is clipped to 16 bits, which may result accuracy loss.
4. The signaled cu_skip_flag may cause overhead bits. In current VVC, the maximum width and height of coding unit for IBC is 64. There is no need to signal cu_skip_flag for blocks of either width or height is larger than 64 in I slice.
5. Alternative luma half-pel interpolation filters flag may be set equal to true even when the CU/PU/block has no half-pel or coarser MV component.

4. Example Methods for Collocated Motion Vectors in Video Coding

The detailed inventions below should be considered as examples to explain general concepts. These inventions should not be interpreted in a narrow way. Furthermore, these inventions can be combined in any manner.

Derivation of the Collocated Motion Vectors

1. Instead of check whether the collocated coding block is intra or IBC coded, how to derive the collocated motion vectors and/or the availability of collocated motion vectors may depend on whether the prediction mode of the collocated coding block is inter or not. In this case, there is no need to store the four prediction modes for each block, only one 1 bit is required to tell whether the block is inter or non-inter.
   a. In one example, how to derive the collocated motion vectors and/or the availability of collocated motion vectors for the case that the collocated coding block is coded in palette prediction mode may be the same as that for the case that the collocated coding block is coded in intra/IBC prediction mode.
   b. In one example, when the collocated coding block is coded in a non-inter prediction mode (e.g., intra, palette, or IBC), the collocated motion vector may be set to be unavailable.
   c. Alternatively, collocated motion vectors may be marked as available, and a default motion vector may be assigned as the collocated motion vector when the collocated coding block is coded in a non-inter prediction mode (e.g., intra, palette, or IBC).
   d. Alternatively, other blocks (e.g., one neighboring inter coded block of the collocated coding block) may be checked instead when the collocated coding block is coded in a non-inter prediction mode.
      i. In one example, the neighboring block may the nearest inter coded block left/right/above/bottom the collocated coding block.
2. The determination of the collocated motion vectors may depend on the reference lists and/or reference indices of the collocated coding block.
   a. In one example, the collocated motion vectors may be derived (e.g., using prior art as described in 2.8.1) when the reference index of reference list X (e.g. L1) of the collocated coding block is not equal to a specific value (e.g., 0).
   b. In one example, the derivation of the collocated motion vectors may be invoked when the reference index of reference list X (e.g. L1) of the collocated coding block is equal to a specific value (e.g., 0).
   c. Alternatively, furthermore, when the collocated coding block is coded in a non-inter prediction mode (including or excluding IBC), or its reference picture doesn't satisfy a given condition, the collocated MV is set to be unavailable.
      i. Alternatively, the collocated MV is set to a default value.

Sample Prediction of BCW

3. The weight table applied in the BCW coding mode may be asymmetry.
   a. In one example, for a weight W as an entry of the table, (1−W) may not be a table entry, wherein W is in the range of [a, b] wherein (a+b) is equal to 1.
   b. In one example, for a weight W as an entry of the table, ($2^N$−W) may not be a table entry, assuming that the final prediction block is generated by (W0*P0+W1*P1)>>N wherein W0 and W1 are two weights applied to two prediction blocks P0 and P1, respectively; and (W0+W1) is equal to (1<<N).
4. The weights in the weight table applied in the BCW coding mode may not be in a monotonically increasing order.

a. In one example, the (i+1)-th entry of the table may have a smaller value than the i-th entry of the table.
5. In one example, the weighted sample prediction process of BCW may depend on a different weight look up table.
   a. In one example, {4, 5, 3, 10, 2}/{4, 3, 5, 10, 2}/{4, 5, 3, 10, 1}/{4, 3, 5, 10, 1}/{4, 5, 3, 10, −1} may be used as the weight look up table of BCW.
6. In one example, in the weighted sample prediction process of BCW, the intermediate prediction sample in each prediction direction may be converted (if necessary, e.g., when the first bit depth is not equal to the bit depth of the intermediate prediction sample) to a first bit depth, then weighted prediction may be applied and the final prediction sample may be converted to a second bit depth.
   a. In one example, the second bit depth is same with the input bit depth of the current color component.
   b. In one example, in conversion between different bit depth, right shift (e.g., covert a sample from a higher bit depth to a lower bit depth) or left shift (e.g., covert a sample from a lower bit depth to a higher bit depth) may be applied.
      i. Alternatively, furthermore, an offset may be added before the right shift or left shift.
   c. In one example, the first bit depth is same with the bit depth of the intermediate prediction sample. The weighted sample prediction of BCW may be derived as: pbSamples[x][y]=Clip3(0, (1<<bitDepth)−1, (w0*predSamplesL0[x][y]+w1*predSamplesL1[x][y]+offset3)>>(shift1+3)), where shift1 is set equal to Max(2, 14−bitDepth), the variable offset3 is set equal to 1<<(shift1+2), and the bitDepth is a bit depth of a current color component.
   d. In one example, the first bit depth is same to the input bit depth of the current color component. The weighted sample prediction of BCW may be derived as: pbSamples[x][y]=Clip3(0, (1<<bitDepth)−1, (w0*((predSamplesL0[x][y]+offset1)>>shift1)+w1*((predSamplesL1[x][y]+offset1)>>shift1)+4)>>3), where shift1 is set equal to Max(2, 14−bitDepth), the variable offset1 is set equal to 1<<(shift1−1).

MMVD Range
7. In one example, the merge motion vector difference may be clipped to the same range as the motion vector.
   a. In one example, the merge motion vector difference may be clipped to 18 bits, e.g., [−$2^{17}$, $2^{17}$−1], which is the same as motion vector range in VVC.
   b. In one example, the merge motion vector difference may be clipped to [−$2^{17}$+1, $2^{17}$−1].
   c. In one example, the merge motion vector difference may not be clipped.
      i. For example, after the merge motion vector difference is added to the motion vector prediction candidate, the result of motion vector is clipped to 18 bits.

Signal of the cu_skip_flag
8. It is proposed that the indication of whether a CU/PU/block is coded in skip mode (e.g., cu_skip_flag) may be conditionally signaled, depending on the dimensions of the coding block.
   a. In one example, the indication (e.g., cu_skip_flag) may be signaled when the current slice type is I-slice, and the sps_ibc_enabled_flag is equal to true, and both the block width and block height are less than or equal to N (N is an integer). For example, N=64.
   b. In one example, when the current block is coded in IBC mode, the indication (e.g., cu_skip_flag) may be signaled when both the block width and block height are less than or equal to N (N is an integer). For example, N=64.

Coding Tools on Chroma Components
9. Whether a coding tool X (e.g., X being TMVP/ATMVP/BCW/MMVD/PDPC) could be applied on one block of a first color component may depend on whether it is applied on one or multiple corresponding blocks in a second color component.
   a. In one example, the usage of the coding tool X for a first color component (e.g., chroma) block may be disabled when the coding tool is applied to the corresponding second color component (e.g., luma) block.
   b. In one example, the usage of the coding tool X for a first color component (e.g., chroma) block may be disabled when a coding tool Y (wherein Y is different from X) is applied to the corresponding second color component (e.g., luma) block.
   c. In one example, a message (such as a flag or an index) may be conditionally signaled to indicate whether coding tool X is applied on first color components of a block. The condition may be defined as whether it is applied on the corresponding second color component blocks. Alternatively, furthermore, it is not applied on first components of a block without signaling if it is not applied on the corresponding second color component blocks.
      i. In one example, coding tool X may be applied in a different manner on different color components.
         1) It may be signaled how to apply coding tool X on the luma component and the chroma components separately.
   d. In one example, the first color component is chroma component and the second color component is the luma component.
   e. In one example, the first color component is one chroma color component and the second color component is another chroma color component.
   f. In one example, the first color component is luma color component and the second color component is a chroma color component.
   g. In the above discussion, a "corresponding second color component block" may refer to a second color component block which covers at least one "corresponding sample" of the first color component block.
      i. In one example, the first color component is chroma component and the second color component is the luma component.
      ii. The sample positions may be scaled according to the color format such as 4:4:4 or 4:2:0. Suppose the top-left position of the chroma block is (x0, y0), and the width and height of the chroma block are W and H, all of which are scaled to the luma sample unit.
      iii. In one example, the corresponding sample may be at (x0, y0);
      iv. In one example, the corresponding sample may be at (x0+W−1, y0+H−1);
      v. In one example, the corresponding sample may be at (x0+W/2−1, y0+H/2−1);
      vi. In one example, the corresponding sample may be at (x0+W/2, y0+H/2); vii. In one example, the corresponding sample may be at (x0+W/2, y0+H/2−1);

viii. In one example, the corresponding sample may be at (x0+W/2−1, y0+H/2);
    h. In the above discussion, "chroma components" may refer to "one or multiple chroma components".
10. It is proposed that position-dependent intra prediction sample filtering process (a.k.a. PDPC) may be disabled for some chroma components when the co-located luma block of the chroma block is coded in some modes.
    a. In one example, such process may be disabled when the co-located luma block of the chroma block is coded in MIP (Matrix-based Intra Prediction) mode.
    b. In one example, such process may be disabled when the co-located luma block of the chroma block is coded in MRL (Multiple Reference Line) mode.
11. Indication of whether an alternative half-pel interpolation filter is used may be set equal to false when a CU/PU/block only has MV component with finer precision (e.g., 1/4-pel, 1/8-pel etc.) than half-pel. That is to say, the default half-pel interpolation filter instead of the alternative half-pel interpolation filter may be used.
    a. In one example, such indication may be set equal to false in MMVD mode if the reconstructed MV only has MV component with finer precision than half-pel.
    b. In one example, such indication may be set equal to false for a pair-wise merge candidate if it only has MV component with finer precision than half-pel.
    c. In one example, such indication may be set equal to false when a reconstructed bi-predicted motion information is converted to a uni-predicted motion information (e.g., applied on small blocks like 4*8 or/and 8*4 blocks) which only has MV component with finer precision than half-pel.
12. Indication of whether an alternative half-pel interpolation filter is used may be always set equal to false in some cases. That is to say, the default half-pel interpolation filter may be always used in these cases.
    a. In one example, such indication may be always set equal to false in MMVD mode.
    b. In one example, such indication may be always set equal to false in MMVD mode when some specific MVDs are selected.
        i. For example, if an MVD with 1/4-pel precision is selected, such indication may be set equal to false.
    c. In one example, such indication may be always set equal to false for pair-wise merge candidates.
    d. In one example, such indication may be always set equal to false when a reconstructed bi-predicted motion information is converted to a uni-predicted motion information (e.g., applied on small blocks like 4*8 or/and 8*4 blocks).

General Solutions

13. Whether to and/or how to apply the disclosed methods above may be signaled at sequence level/picture level/slice level/tile group level, such as in sequence header/picture header/SPS/VPS/DPS/PPS/APS/slice header/tile group header.

The examples described above may be incorporated in the context of the methods described below, e.g., methods 800, 900, 1000, 1100, 1200 and 1300, which may be implemented at a video decoder or a video encoder.

Figure 8:
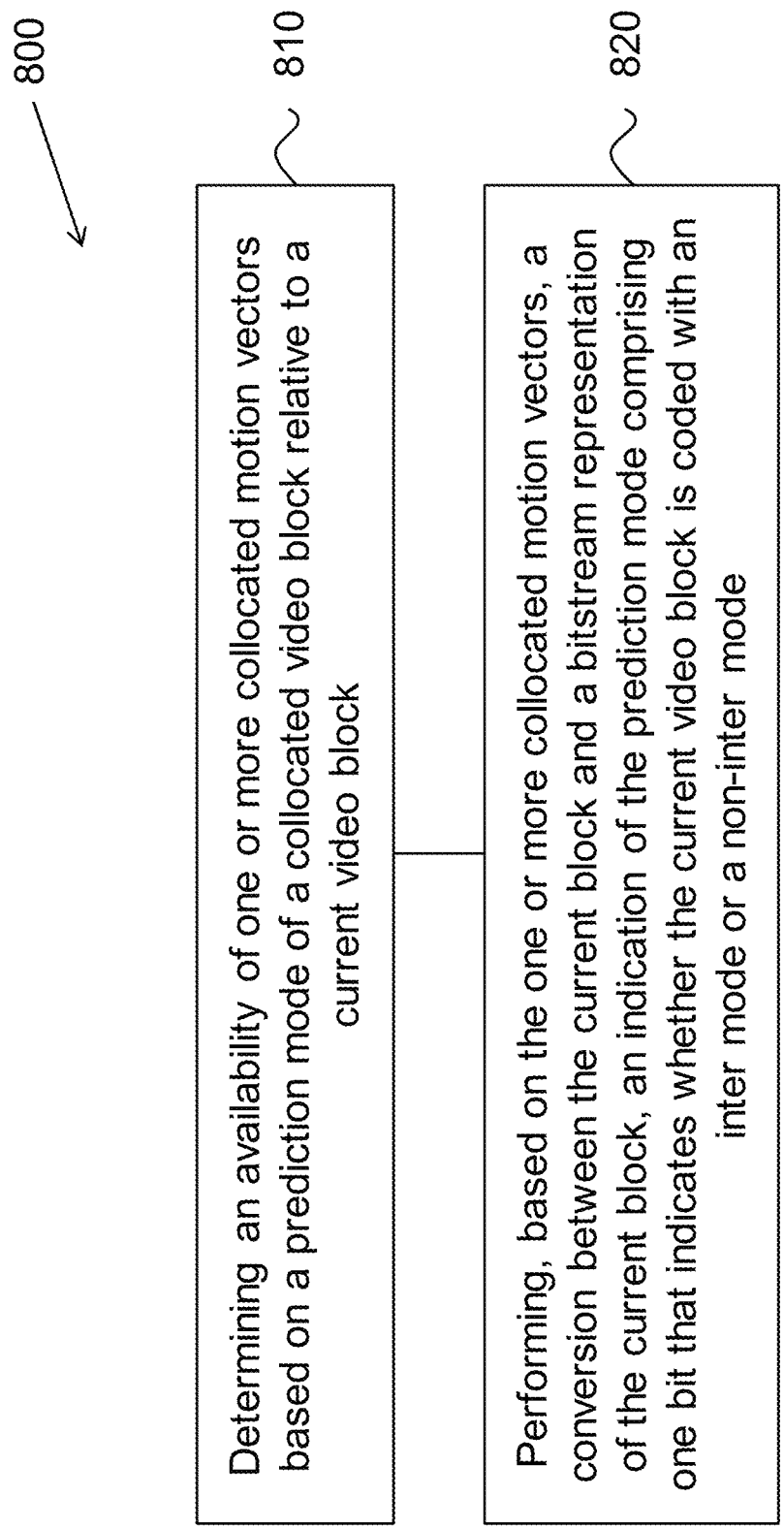
FIG. 8 is a flowchart for an example of a video processing method.

FIG. 8 shows a flowchart of an exemplary method for video processing. The method 800 includes, at step 810, determining an availability of one or more collocated motion vectors based on a prediction mode of a collocated video block relative to a current video block.

The method 800 includes, at step 820, performing, based on the one or more collocated motion vectors, a conversion between the current block and a bitstream representation of the current block, an indication of the prediction mode comprising one bit that indicates whether the current video block is coded with an inter mode or a non-inter mode.

Figure 9:
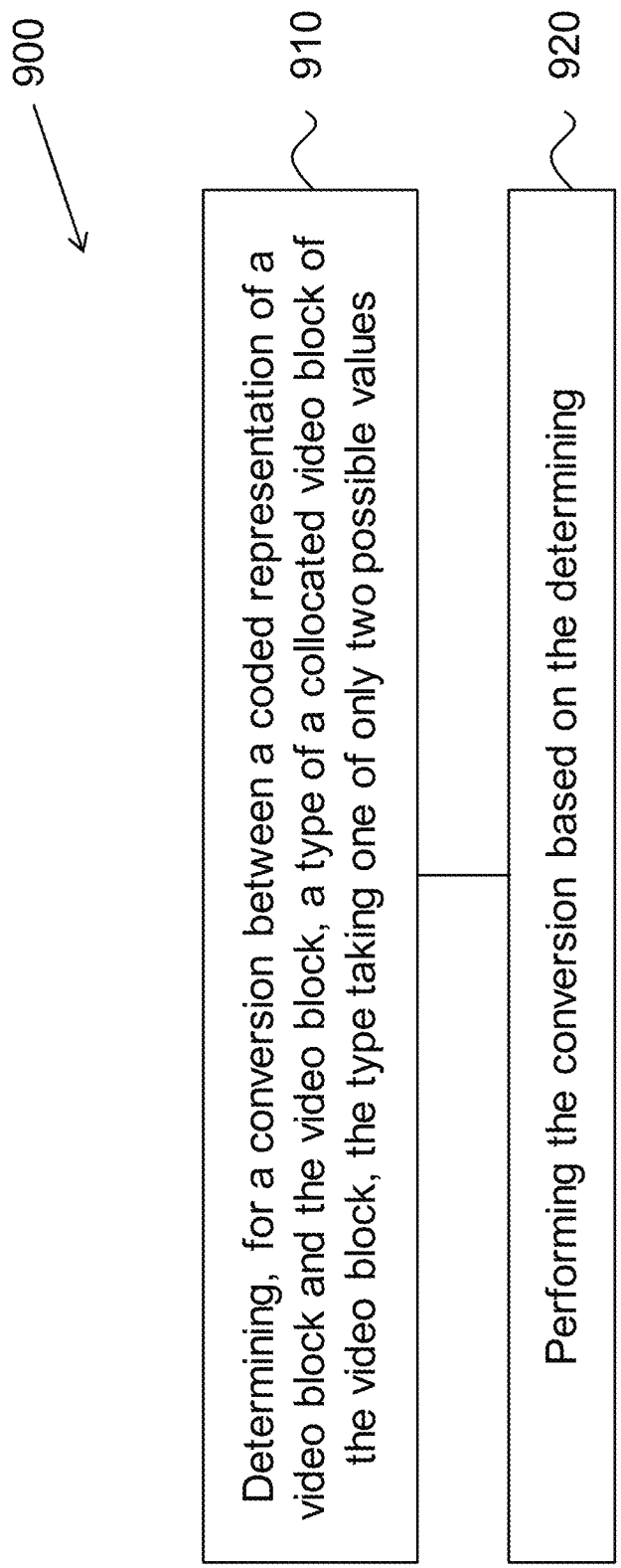
FIG. 9 is a flowchart for another example of a video processing method.

FIG. 9 shows a flowchart of an exemplary method for video processing. The method 800 includes, at step 910, determining, for a conversion between a coded representation of a video block and the video block, a type of a collocated video block of the video block, the type taking one of only two possible values.

The method 800 includes, at step 920, performing the conversion based on the determining.

FIG. 10 shows a flowchart of an exemplary method for video processing. The method 800 includes, at step 1010, deriving, based on a first weight table associated with a bi-prediction mode with a coding unit (CU)-level weight (BCW) process, a prediction sample for a current block, the first weight table being asymmetric.

The method 800 includes, at step 1020, performing, based on the prediction sample, a conversion between the current block and a bitstream representation of the current block.

Figure 11:
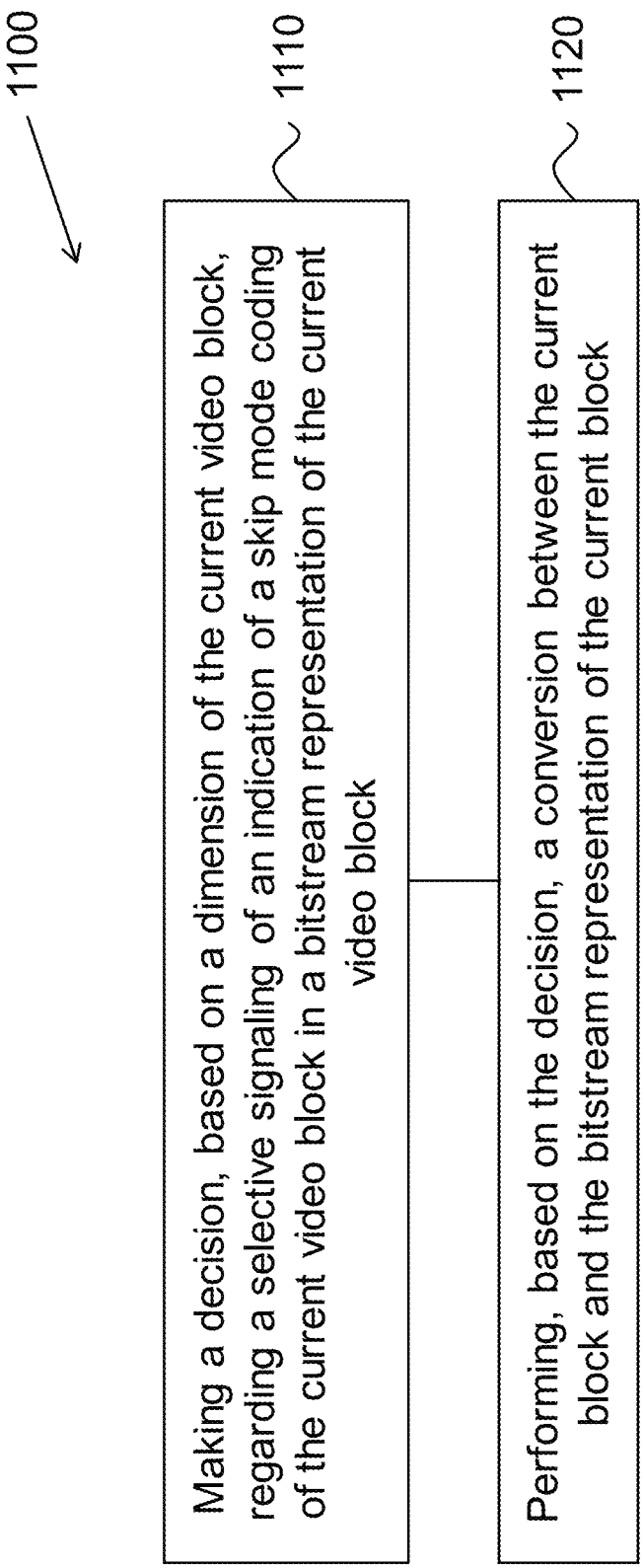
FIG. 11 is a flowchart for yet another example of a video processing method.

FIG. 11 shows a flowchart of an exemplary method for video processing. The method 800 includes, at step 1110, making a decision, based on a dimension of the current video block, regarding a selective signaling of an indication of a skip mode coding of the current video block in a bitstream representation of the current video block.

The method 800 includes, at step 1120, performing, based on the decision, a conversion between the current block and the bitstream representation of the current block.

Figure 12:
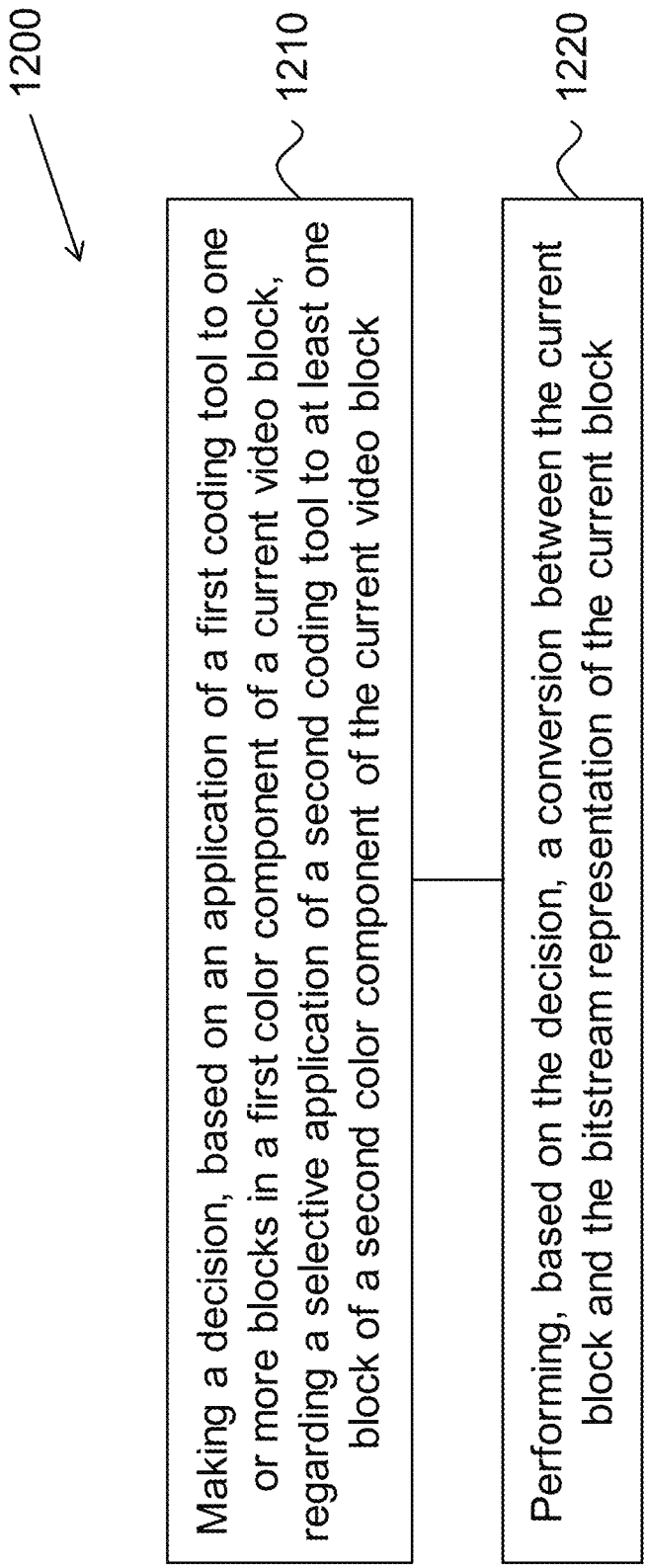
FIG. 12 is a flowchart for yet another example of a video processing method.

FIG. 12 shows a flowchart of an exemplary method for video processing. The method 800 includes, at step 1210, making a decision, based on an application of a first coding tool to one or more blocks in a first color component of a current video block, regarding a selective application of a second coding tool to at least one block of a second color component of the current video block.

The method 800 includes, at step 1220, performing, based on the decision, a conversion between the current block and the bitstream representation of the current block.

Figure 13:
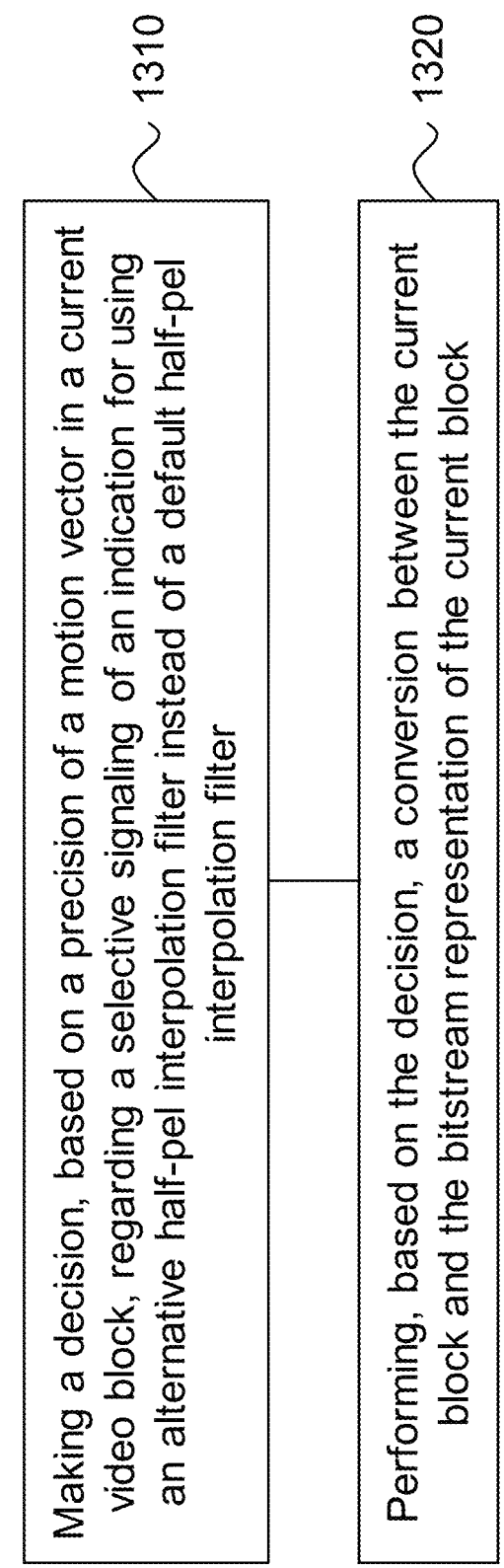
FIG. 13 is a flowchart for yet another example of a video processing method.

FIG. 13 shows a flowchart of an exemplary method for video processing. The method 800 includes, at step 1310, making a decision, based on a precision of a motion vector in a current video block, regarding a selective signaling of an indication for using an alternative half-pel interpolation filter instead of a default half-pel interpolation filter.

The method 800 includes, at step 1320, performing, based on the decision, a conversion between the current block and the bitstream representation of the current block.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

5. Exemplary Embodiments of the Disclosed Technology

The changes are highlighted in bold and Italic. Deleted texts are marked with double brackets (e.g., [[a]] denotes the deletion of the character "a").

5.1 Embodiment #1

The working draft specified in JVET-O2001-vE may be changed as below.
8.5.2.12 Derivation Process for Collocated Motion Vectors
. . .

The variables mvLXCol and availableFlagLXCol are derived as follows:

If colCb is coded in an intra or palette or IBC prediction mode, both components of mvLXCol are set equal to 0 and availableFlagLXCol is set equal to 0.

Otherwise, the motion vector mvCol, the reference index refIdxCol and the reference list identifier listCol are derived as follows:

. . .

Alternatively, the following may apply:

The variables mvLXCol and availableFlagLXCol are derived as follows:

If colCb is not coded in an [[intra or IBC]] inter prediction mode, both components of mvLXCol are set equal to 0 and availableFlagLXCol is set equal to 0.

Otherwise, the motion vector mvCol, the reference index refIdxCol and the reference list identifier listCol are derived as follows:

. . .

5.2 Embodiment #2

The working draft specified in JVET-O2001-vE may be changed as below.
8.5.1 General Decoding Process for Coding Units Coded in Inter Prediction Mode
. . .

3. The arrays of luma and chroma motion vectors after decoder side motion vector refinement, refMvLX[xSbIdx][ySbIdx] and refMvCLX[xSbIdx][ySbIdx], with X being 0 and 1, are derived as follows for xSbIdx= 0 . . . numSbX−1, ySbIdx=0 . . . numSbY−1:

If dmvrFlag is equal to 1, the derivation process for chroma motion vectors in clause 8.5.2.13 is invoked with refMvLX[xSbIdx][ySbIdx] and refIdxLX as inputs, and refMvCLX[xSbIdx][ySbIdx] as output and the input refMvLX[xSbIdx][ySbIdx] is derived as follows;

$$\text{refMv}LX[xSbIdx][ySbIdx]=\text{mv}LX[xSbIdx][ySbIdx]+ dMvLX[xSbIdx][ySbIdx] \quad (8\text{-}287)$$

$$\text{refMv}LX[xSbIdx][ySbIdx][0]=\text{Clip3}(-2^{17},2^{17}-1, \text{refMv}LX[xSbIdx][ySbIdx][0]) \quad (8\text{-}288)$$

$$\text{refMv}LX[xSbIdx][ySbIdx][1]=\text{Clip3}(-2^{17},2^{17}-1, \text{refMv}LX[xSbIdx][ySbIdx][1]) \quad (8\text{-}289)$$

Otherwise (dmvrFlag is equal to 0), the following applies:

$$\text{refMv}LX[xSbIdx][ySbIdx]=\text{mv}LX[xSbIdx][ySbIdx] \quad (8\text{-}290)$$

$$\text{refMv}CLX[xSbIdx][ySbIdx]=\text{mv}CLX[xSbIdx][ySbIdx] \quad (8\text{-}291)$$

NOTE—The array refMvLX is stored in MvDmvrLX and used in the derivation process for collocated motion vectors in clause 8.5.2.12. After decoding a slice, MvDmvrLX[xSbIdx][ySbIdx] and the corresponding reference indices are all set equal to −1 when the coding block Cb[xSbIdx][ySbIdx] is coded in an IBC prediction mode. The array of non-refine luma motion vectors MvLX is used in the spatial motion vector prediction and deblocking boundary strength derivation processes.

. . .

8.5.2.12 Derivation Process for Collocated Motion Vectors
. . .

The variables mvLXCol and availableFlagLXCol are derived as follows:

If colCb is coded in an intra or IBC prediction mode, both components of mvLXCol are set equal to 0 and availableFlagLXCol is set equal to 0.

Otherwise, the motion vector mvCol, the reference index refIdxCol and the reference list identifier listCol are derived as follows: If predFlagL0Col[xColCb][yColCb] is equal to 0 and predFlagL1Col[xColCb][yColCb] is equal to 0, both components of mvLXCol are set equal to 0 and availableFlagLXCol is set equal to 0.

Otherwise, the following applies:
If sbFlag is equal to 0, availableFlagLXCol is set to 1 and the following applies:
If predFlagL0Col[xColCb][yColCb] is equal to 0, mvCol, refIdxCol and listCol are set equal to mvL1Col[xColCb][yColCb], refIdxL1Col[xColCb][yColCb] and L1, respectively.
Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCb], refIdxL0Col[xColCb][yColCb] and L0, respectively.

Otherwise (predFlagL0Col[xColCb][yColCb] is equal to 1 and predFlagL1Col[xColCb][yColCb] is equal to 1), the following assignments are made:

If NoBackwardPredFlag is equal to 1, mvCol, refIdxCol and listCol are set equal to mvLXCol[xColCb][yColCb], refIdxLXCol[xColCb][yColCb] and LX, respectively.

Otherwise, mvCol, refIdxCol and listCol are set equal to mvLNCol[xColCb][yColCb], refIdxLNCol[xColCb][yColCb] and LN, respectively, with N being the value of collocated_from_l0_flag.

Otherwise (sbFlag is equal to 1), the following applies:

If PredFlagLXCol[xColCb][yColCb] is equal to 1, mvCol, refIdxCol, and listCol are set equal to mvLXCol[xColCb][yColCb], refIdxLXCol[xColCb][yColCb], and LX, respectively, availableFlagLXCol is set to 1.

Otherwise (PredFlagLXCol[xColCb][yColCb] is equal to 0), the following applies:

If NoBackwardPredFlag is equal to 1 and PredFlagLYCol[xColCb][yColCb] is equal to 1, mvCol, refIdxCol, and listCol are set to mvLYCol[xColCb][yColCb], refIdxLYCol[xColCb][yColCb] and LY, respectively, with Y being equal to !X where X being the value of X this process is invoked for. availableFlagLXCol is set equal to 1.

Otherwise, both components of mvLXCol are set equal to 0 and availableFlagLXCol is set equal to 0.

. . .

5.3 Embodiment #3

The working draft specified in JVET-O2001-vE may be changed as below.

8.5.6.6.2 Default Weighted Sample Prediction Process

. . .

Variables shift1, shift2, offset1, offset2, and offset3 are derived as follows:

The variable shift1 is set equal to Max(2, 14−bitDepth) and the variable shift2 is set equal to Max(3, 15−bitDepth).

The variable offset1 is set equal to 1<<(shift1−1).

The variable offset2 is set equal to 1<<(shift2−1).

The variable offset3 is set equal to 1<<(shift2+I[[2]]).

. . .

Otherwise (predFlagL0 is equal to 1 and predFlagL1 is equal to 1), the following applies:

If bcwIdx is equal to 0 or cuip_flag[xCb][yCb] is equal to 1, the prediction sample values are derived as follows:

$$pbSamples[x][y]=Clip3(0,(1<<bitDepth)-1, \quad (8\text{-}823)$$

$$(predSamplesL0[x][y]+predSamplesL1[x][y]+offset2)>>shift2)$$

Otherwise (bcwIdx is not equal to 0 and cip_flag[xCb][yCb] is equal to 0), the following applies:

The variable w1 is set equal to bcwWLut[bcwIdx] with bcwWLut[k]={4, 5, 3, 10, −2}.

The variable w0 is set equal to (8−w1).

The prediction sample values are derived as follows.

$$pbSamples[x][y]=Clip3(0,(1<<bitDepth)-1, \quad (8\text{-}824)$$

$$(w0*predSamplesL0[x][y]+w1*predSamplesL1[x][y]+offset3)>>(shift2+[[3]]2))$$

. . .

Alternatively, the following may apply:

. . .

Variables shift1, shift2, offset1, offset2, and offset3 are derived as follows:

The variable shift1 is set equal to Max(2, 14−bitDepth) [[and the variable shift2 is set equal to Max(3, 15−bitDepth)]].

The variable offset1 is set equal to 1<<(shift1−1).

The variable offset2 is set equal to 1<<(shift1+[[2−]]1).

The variable offset3 is set equal to 1<<(shift[[2]]1+2).

. . .

Otherwise (predFlagL0 is equal to 1 and predFlagL1 is equal to 1), the following applies:

If bcwIdx is equal to 0 or ciip_flag[xCb][yCb] is equal to 1, the prediction sample values are derived as follows:

$$pbSamples[x][y]=Clip3(0,(1<<bitDepth)-1, \quad (8\text{-}823)$$

$$(predSamplesL0[x][y]+predSamplesL1[x][y]+offset2)>>(shift1+1)[[2]])$$

Otherwise (bcwIdx is not equal to 0 and cip_flag[xCb][yCb] is equal to 0), the following applies:

The variable w1 is set equal to bcwWLut[bcwIdx] with bcwWLut[k]={4, 5, 3, 10, −2}.

The variable w0 is set equal to (8−w1).

The prediction sample values are derived as follows.

$$pbSamples[x][y]=Clip3(0,(1<<bitDepth)-1, \quad (8\text{-}824)$$

$$(w0*predSamplesL0[x][y]+w1*predSamplesL1[x][y]+offset3)>>(shift1+3[[2+3]]))$$

. . .

Alternatively, the following may apply:

. . .

Variables shift1, shift2, offset1, offset2, and offset3 are derived as follows:

The variable shift1 is set equal to Max(2, 14−bitDepth) and the variable shift2 is set equal to Max(3, 15−bitDepth).

The variable offset1 is set equal to 1<<(shift1−1).

The variable offset2 is set equal to 1<<(shift2−1).

[[The variable offset3 is set equal to 1<<(shift2+2).]]

. . .

Otherwise (predFlagL0 is equal to 1 and predFlagL1 is equal to 1), the following applies:

If bcwIdx is equal to 0 or ciip_flag[xCb][yCb] is equal to 1, the prediction sample values are derived as follows:

$$pbSamples[x][y]=Clip3(0,(1<<bitDepth)-1, \quad (8\text{-}823)$$

$$(predSamplesL0[x][y]+predSamplesL1[x][y]+offset2)>>shift2)$$

Otherwise (bcwIdx is not equal to 0 and cip_flag[xCb][yCb] is equal to 0), the following applies:

The variable w1 is set equal to bcwWLut[bcwIdx] with bcwWLut[k]={4, 5, 3, 10, −2}.

The variable w0 is set equal to (8−w1).

The prediction sample values are derived as follows.

$$pbSamples[x][y]=Clip3(0,(1<<bitDepth)-1, \quad (8\text{-}824)$$

(w0*((predSamplesL0[x][y]+offset1)>>shift1)+
w1*((predSamplesL1[x][y]+offset1)>>shift))+
4)>>(8[[shift2+3)]])

...

5.4 Embodiment #4

The working draft specified in JVET-O2001-vE may be changed as below.
8.5.6.6.2 Default Weighted Sample Prediction Process
...
Otherwise (bcwIdx is not equal to 0 and ciip_flag[xCb][yCb] is equal to 0), the following applies:
The variable w1 is set equal to bcwWLut[bcwIdx] with bcwWLut[k]={4, 5, 3, 10, 2[[−2]]}/{4, 5, 3, 10, 1}/{4, 3, 5, 10, 2}/{4, 3, 5, 10, 1}/{4, 5, 3, 10, −1}.
...

5.5 Embodiment #5

The working draft specified in JVET-O2001-vE may be changed as below.

8.5.2.7 Derivation Process for Merge Motion Vector Difference
...
mMvdL1[0]=Clip3(−2$^{[[15]]17}$, 2$^{[[15]]17}$−1, (distScaleFactor*mMvdL0[0]+(8−394) 128− (distScaleFactor*mMvdL0[0]>=0))>>8)
mMvdL1[1]=Clip3(−2$^{[[15]]17}$, 2$^{[[15]]17}$−1, (distScaleFactor*mMvdL0[1]+(8−395) 128− (distScaleFactor*mMvdL0[1]>=0))>>8)
mMvdL0[0]=Clip3(−2$^{[[15]]17}$, 2$^{[[15]]17}$−1, (distScaleFactor*mMvdL1[0]+(8−404) 128− (distScaleFactor*mMvdL1[0]>=0))>>8)
mMvdL0[1]=Clip3(−2$^{[[15]]17}$, 2$^{[[15]]17}$−1, (distScaleFactor*mMvdL1[1]+(8−405) 128− (distScaleFactor*mMvdL1[1]>=0))>>8))
...

5.6 Embodiment #6

The working draft specified in JVET-O2001-vE may be changed as below.
7.3.8.5 Coding Unit Syntax
...

|  | Descriptor |
|---|---|
| coding_unit( x0, y0, cbWidth, cbHeight, cqtDepth, treeType, modeType ) { | |
|   chType = treeType = = DUAL_TREE_CHROMA? 1 : 0 | |
|   if( slice_type != I \| \| sps_ibc_enabled_flag[[ \| \| sps_palette_enabled_flag]]) { | |
|     if( treeType != DUAL_TREE_CHROMA && | |
|       !( ( ( cbWidth = = 4 && cbHeight = = 4 ) \| \| modeType = = MODE TYPE INTRA) | |
|       && !(sps_ibc_enabled_flag *&& cbWidth <=64 && cbHeight <= 64)* ) ) | |
|       cu_skip_flag[ x0 ][ y0 ] | ae(v) |
|     if( cu_skip_flag[ x0 ][ y0 ] = = 0 && slice_type != I | |
|     && !( cbWidth = = 4 && cbHeight = = 4 ) && modeType = = MODE_TYPE_ALL ) | |
|       pred_mode_flag | ae(v) |
|     if( ( ( slice_type = = I && cu_skip_flag[ x0 ][ y0 ] = =0 ) \| \| | |
|       ( slice_type != I && ( CuPredMode[ chType ][ x0 ][ y0 ] != MODE_INTRA \| \| | |
|         ( cbWidth = = 4 && cbHeight = = 4 && cu_skip_flag[ x0][y0]= = 0 ) ) ) ) && | |
|       cbWidth <= 64 && cbHeight <= 64 && modeType != MODE_TYPE_INTER && | |
|       sps_ibc_enabled_flag && treeType != DUAL_TREE_CHROMA ) | |
|       pred_mode_ibc_flag | ae(v) |
| } | |
|     if( ( ( ( slice_type = = I \| \| ( cbWidth = = 4 && cbHeight = = 4 ) \| \| sps_ibc_enabled_flag ) && | |
|       CuPredMode[ x0 ][ y0 ] = = MODE INTRA) \| \| | |
|       ( slice type != I && !(cbWidth = = 4 && cbHeight = = 4 ) && !sps_ibc_enabled_flag | |
|       && CuPredMode[ x0 ][y0 ] != MODE_INTRA ) ) && sps_palette_enabled_flag && | |
|       cbWidth <= 64 && cbHeight <= 64 && && cu_skip_flag[ x0 ][ y0 ] = = 0 && | |
|       modeType != MODE_INTER) | |
|       pred_mode_plt_flag | ae(v) |
| [[}]] | |

Figure 14A:
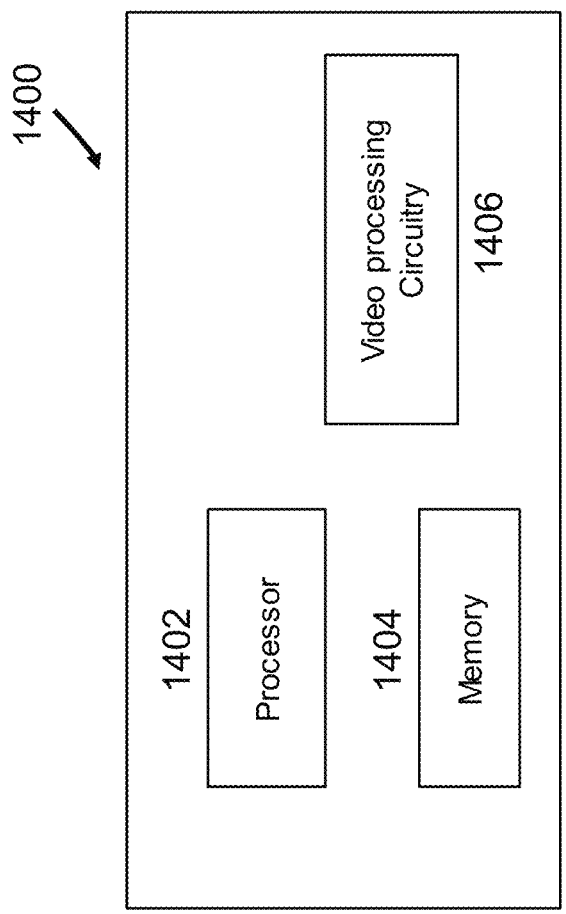
FIGS. 14A and 14B are block diagrams of examples of a hardware platform for implementing a visual media decoding or a visual media encoding technique described in the present document.

FIG. 14A is a block diagram of a video processing apparatus 1400. The apparatus 1400 may be used to implement one or more of the methods described herein. The apparatus 1400 may be embodied in a smartphone, tablet, computer, Internet of Things (IoT) receiver, and so on. The apparatus 1400 may include one or more processors 1402, one or more memories 1404 and video processing hardware 1406. The processor(s) 1402 may be configured to implement one or more methods (including, but not limited to, methods 800, 900, 1000, 1100, 1200 and 1300) described in the present document. The memory (memories) 1404 may be used for storing data and code used for implementing the methods and techniques described herein. The video processing hardware 1406 may be used to implement, in hardware circuitry, some techniques described in the present document. In some embodiments, the hardware 1406 may be completely or partially implemented in the processor 1402, e.g., a graphics co-processor.

Figure 14B:
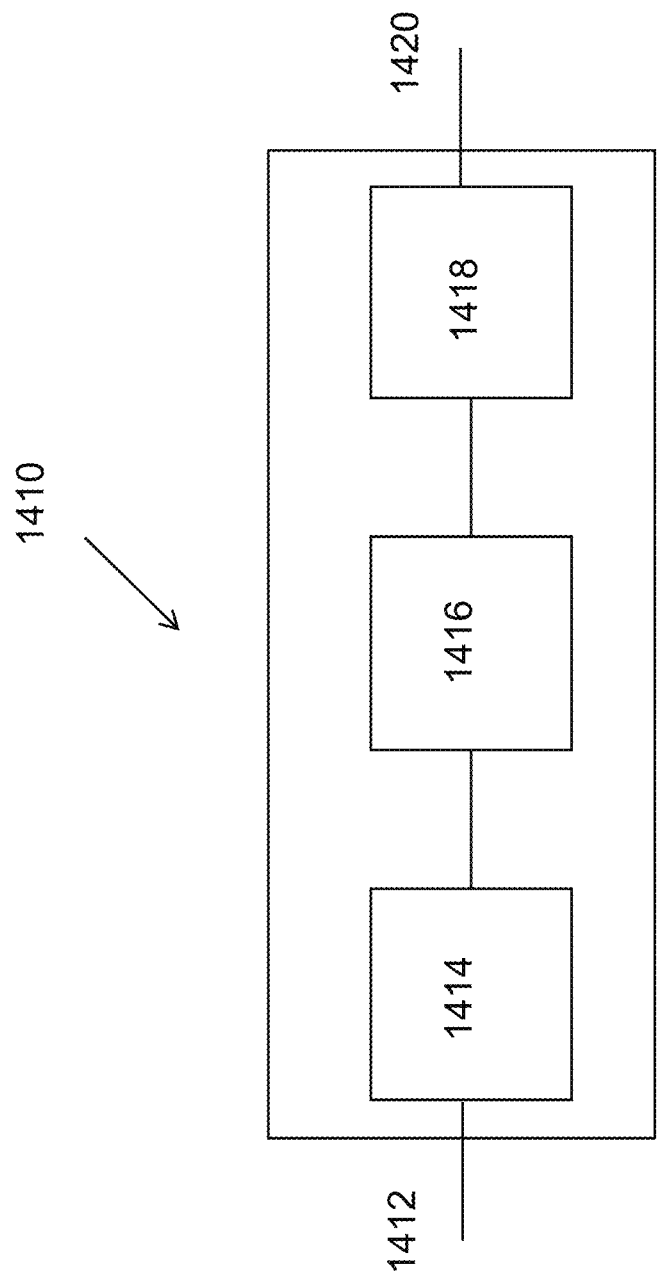

FIG. 14B is a block diagram showing an example video processing system 1410 in which various techniques disclosed herein may be implemented. Various implementations may include some or all of the components of the system 1410. The system 1410 may include input 1412 for receiving video content. The video content may be received in a raw or uncompressed format, e.g., 8 or 10 bit multi-component pixel values, or may be in a compressed or encoded format. The input 1412 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1410 may include a coding component 1414 that may implement the various coding or encoding methods described in the present document. The coding component 1414 may reduce the average bitrate of video from the input 1412 to the output of the coding component 1414 to produce a coded representation of the video. The coding techniques are therefore sometimes called video compression or video transcoding techniques. The output of the coding component 1414 may be either stored, or transmitted via a communication connected, as represented by the component 1416. The stored or communicated bitstream (or coded) representation of the video received at the input 1412 may be used by the component 1418 for generating pixel values or displayable video that is sent to a display interface 1420. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or display port, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the video coding methods may be implemented using an apparatus that is implemented on a hardware platform as described with respect to FIG. 14A or 14B.

The following listing provides embodiments that can addressed the technical problems described in the present document, among other problems. The first set of clauses describe certain features and aspects of the disclosed techniques in the previous section.

1. A method for processing video, comprising: determining an availability of one or more collocated motion vectors based on a prediction mode of a collocated video block relative to a current video block; and performing, based on the one or more collocated motion vectors, a conversion between the current block and a bitstream representation of the current block, wherein an indication of the prediction mode comprises one bit that indicates whether the current video block is coded with an inter mode or a non-inter mode.

2. A method for processing video, comprising: determining, for a conversion between a coded representation of a video block and the video block, a type of a collocated video block of the video block, wherein the type takes one of only two possible values; and performing the conversion based on the determining.

3. The method of clause 1, wherein the two possible values include a first value indicating that the collocated video block is inter-coded and a second value that indicates that the collocated video block is coded using a mode other than inter-coded.

4. The method of any of clauses 1 to 3, wherein the determining is identical when the current video block is coded with palette prediction mode and when the current video block is coded with an intra or intra block copy (IBC) prediction mode.

5. The method of any of clauses 1 to 3, wherein the one or more collocated motion vectors is determined to be unavailable when the collocated video block is coded with a non-inter prediction mode.

6. The method of any of clauses 1 to 3, wherein the one or more collocated motion vectors is determined to be available and comprises a default motion vector when the collocated video block is coded with a non-inter prediction mode.

7. The method of clause 5 or 6, wherein the non-inter prediction mode is an intra prediction mode, a palette prediction mode or an intra block copy (IBC) prediction mode.

8. The method of any of clauses 1 to 3, wherein the determining is based on a reference index or a reference list of the collocated video block.

9. The method of clause 8, wherein the reference index is a predetermined value.

10. The method of clause 8, wherein the reference index excludes a predetermined value.

11. The method of clause 9 or 10, wherein the predetermined value is 0.

12. A method for video processing, comprising: deriving, based on a first weight table associated with a bi-prediction mode with a coding unit (CU)-level weight (BCW) process, a prediction sample for a current block, wherein the first weight table is asymmetric; and performing, based on the prediction sample, a conversion between the current block and a bitstream representation of the current block.

13. The method of clause 12, wherein entries in the first weight table are non-monotonically increasing.

14. The method of clause 12, wherein the BCW process is further based on a second weight table different from the first weight table.

15. The method of clause 12, wherein deriving the prediction sample comprises: converting an intermediate prediction sample to a first bit depth; applying a weight from the first weight table to the intermediate prediction sample to derive the prediction sample; and converting the prediction sample to a second bit depth.

16. The method of clause 15, wherein the second bit depth is a bit depth of a color component of the current video block.

17. A method for video processing, comprising: making a decision, based on a dimension of the current video block, regarding a selective signaling of an indication of a skip mode coding of the current video block in a bitstream representation of the current video block; and performing, based on the decision, a conversion between the current block and the bitstream representation of the current block.

18. The method of clause 17, wherein the indication is signaled upon a determination that a slice type of a slice comprising the current video block is an I-slice, an sps_ibc_enabled_flag is set to true, and a height and a width of the current video block are less than or equal to N.

19. The method of clause 17, wherein the indication is signaled upon a determination that the current video block is coded with an intra block copy (IBC) mode and a height and a width of the current video block are less than or equal to N.

20. The method of clause 18 or 19, wherein N=64.

21. A method for video processing, comprising: making a decision, based on an application of a first coding tool to one or more blocks in a first color component of a current video block, regarding a selective application of a second coding tool to at least one block of a second color component of the current video block; and performing, based on the decision, a conversion between the current block and the bitstream representation of the current block.

22. The method of clause 21, wherein the second coding tool is applied upon a determination that the second coding tool is identical to the first coding tool.

23. The method of clause 21, wherein the second coding tool is not applied upon a determination that the second coding tool is different from the first coding tool.

24. The method of clause 21, wherein the decision is further based on an indication in the bitstream representation.

25. The method of any of clauses 21 to 24, wherein the first color component is a luma component and the second color component is a chroma component.

26. The method of any of clauses 21 to 24, wherein the first color component is a first chroma color component and the second color component is a second chroma color component.

27. The method of any of clauses 21 to 26, wherein the first coding tool and the second coding tool are one of temporal motion vector prediction (TMVP), alternative temporal motion vector prediction (ATMVP), a bi-prediction with a coding unit (CU)-level weight (BCW) process, a merge mode with motion vector differences (MMVD) or a position-dependent prediction combination (PDPC) process.

28. A method for video processing, comprising: making a decision, based on a precision of a motion vector in a current video block, regarding a selective signaling of an indication for using an alternative half-pel interpolation filter instead of a default half-pel interpolation filter; and performing, based on the decision, a conversion between the current block and the bitstream representation of the current block.

29. The method of clause 28, wherein the default half-pel interpolation filter is used upon a determination that the current video block is coded with a merge mode with motion vector differences (MMVD) and a precision of a reconstructed motion vector is lower than half-pel.

30. The method of any of clauses 1 to 29, wherein performing the conversion is further based on signaling in a decoder parameter set (DPS), a sequence parameter set (SPS), a picture parameter set (PPS), an adaptive parameter set (APS), a video parameter set (VPS), a sequence header, a picture header, a slice header, or a tile group header.

31. The method of any of clauses 1 to 30, wherein performing the conversion comprises generating the bitstream representation from the current video block.

32. The method of any of clauses 1 to 30, wherein performing the conversion comprises generating the current video block from the bitstream representation.

33. A video decoding apparatus comprising a processor configured to implement a method recited in any one of clauses 1 to 32.

34. A computer program product stored on a non-transitory computer readable media, the computer program product including program code for carrying out the method in any one of clauses 1 to 32.

The second set of clauses describe certain features and aspects of the disclosed techniques in the previous section (e.g., items 1 and 2).

1. A method of video processing, comprising: making a first determination about whether a collocated video block of a video block of a video is coded using an inter coding mode or a non-inter coding mode; making a second determination, based on the first determination, about availability of motion vectors of the collocated video block or a mode of derivation of motion vectors for the collocated video block; and performing a conversion between the video block and a coded representation of the video based on the second determination.

2. The method of clause 1, wherein the non-inter coding mode is an intra mode, a palette mode, or an intra block copy (IBC) mode.

3. The method of clause 1, wherein the making of the second determination is performed such that the second determination is identical for the collocated video block coded with a palette mode and for the collocated video block coded with an intra mode.

4. The method of clause 1, wherein the making of the second determination is performed such that the second determination is identical for the collocated video block coded with a palette mode and for the collocated video block coded with an intra block copy mode.

5. The method of clause 1, wherein the making of the second determination is performed such that the second determination is identical for the collocated video block coded with an intra mode and for the collocated video block coded with an intra block copy mode.

6. The method of clause 1, wherein the making a first determination comprises: generating one bit to indicate whether the collocated video block is coded using the inter coding mode or the non-inter coding mode.

7. The method of clause 1, wherein the making of the second determination determines motion vectors of the collocated video block to be unavailable based on the first determination that the collocated video block is coded using the non-inter coding mode.

8. The method of clause 1, wherein the making of the second determination determines motion vectors of the collocated video block to be available based on the first determination that the collocated video block is coded using the non-inter coding mode, and wherein a default motion vector is assigned as the motion vectors of the collocated video block.

9. The method of clause 1, wherein another video block instead of the collocated video block is checked in case that the collocated video block is coded using the non-inter coding mode.

10. The method of clause 9, wherein the another video block is a neighboring block that is a nearest inter coded block that is left, right, above, or below the collocated video block.

11. A method for processing video, comprising: determining, for a conversion between a video block of a video and a coded representation of the video, one or more collocated motion vectors based on a reference index or a reference list of a collocated video block of the video block; and performing the conversion based on the determining.

12. The method of clause 11, wherein the one or more collocated motion vectors are derived in case that the reference index of the reference list of the collocated video block is not equal to a predetermined value.

13. The method of clause 11, wherein the one or more collocated motion vectors are derived in case that the reference index of the reference list of the collocated video block is equal to a predetermined value.

14. The method of clause 12 or 13, wherein the predetermined value is 0.

15. The method of clause 11, wherein in case that the collocated video block is coded in a non-inter coding mode or a reference picture of the collocated video block does not satisfy a given condition, the one or more collocated motion vectors are set to be unavailable.

16. The method of clause 11, wherein in case that the collocated video block is coded in a non-inter coding mode or a reference picture of the collocated video block does not satisfy a given condition, the one or more collocated motion vectors are set to a default value.

17. The method of any of clauses 1 to 16, wherein the conversion includes encoding the video into the coded representation.

18. The method of any of clauses 1 to 16, wherein the conversion includes decoding the coded representation to generate the video.

19. A video processing apparatus comprising a processor configured to implement a method recited in any one or more of clauses 1 to 16.

20. A computer readable medium storing program code that, when executed, causes a processor to implement a method recited in any one or more of clauses 1 to 16.

21. A computer readable medium that stores a coded representation or a bitstream representation generated according to any of the above described methods.

The third set of clauses describe certain features and aspects of the disclosed techniques in the previous section (e.g., items 3 to 7).

Figure 15A:
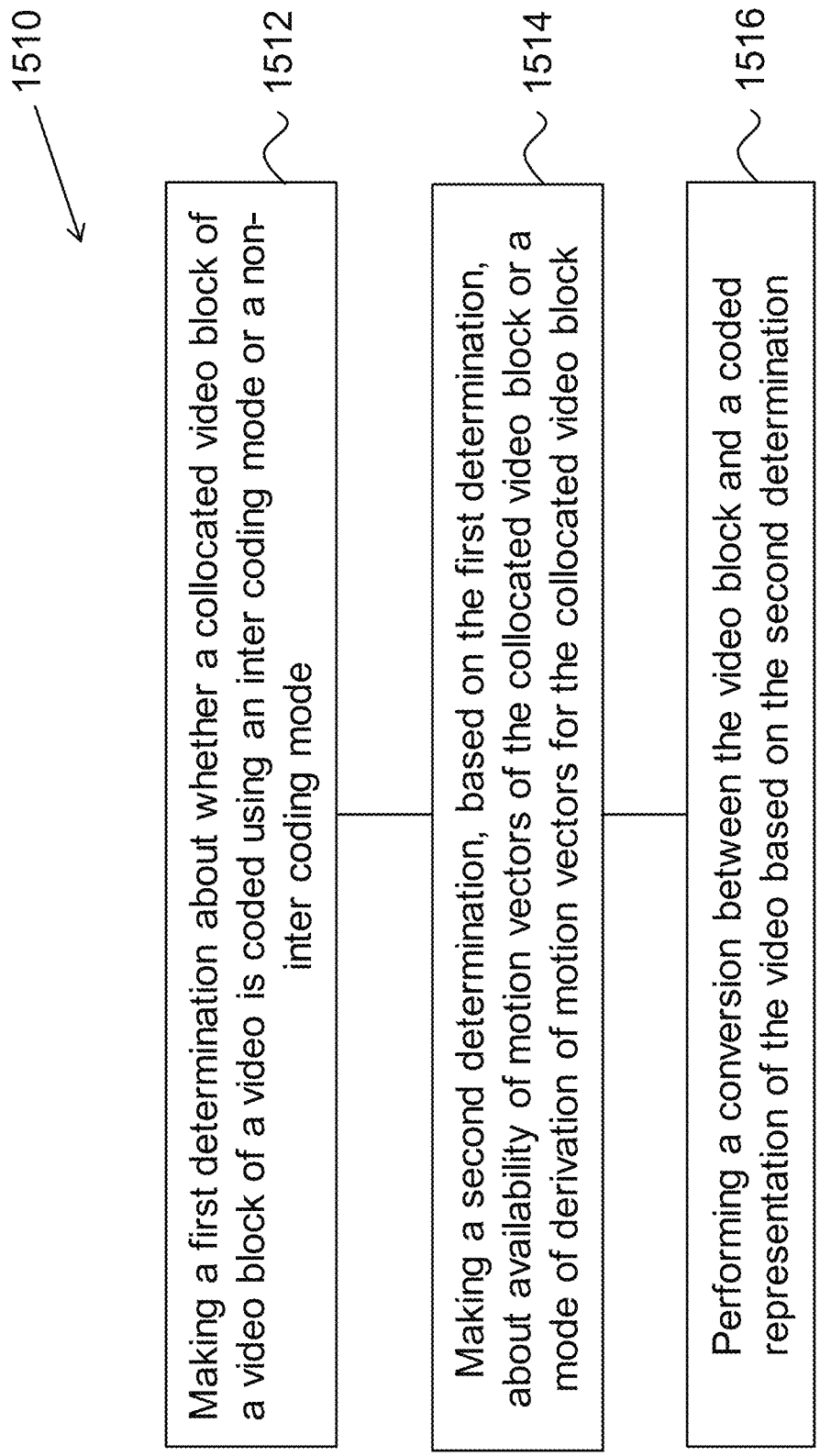
Figure 15B:
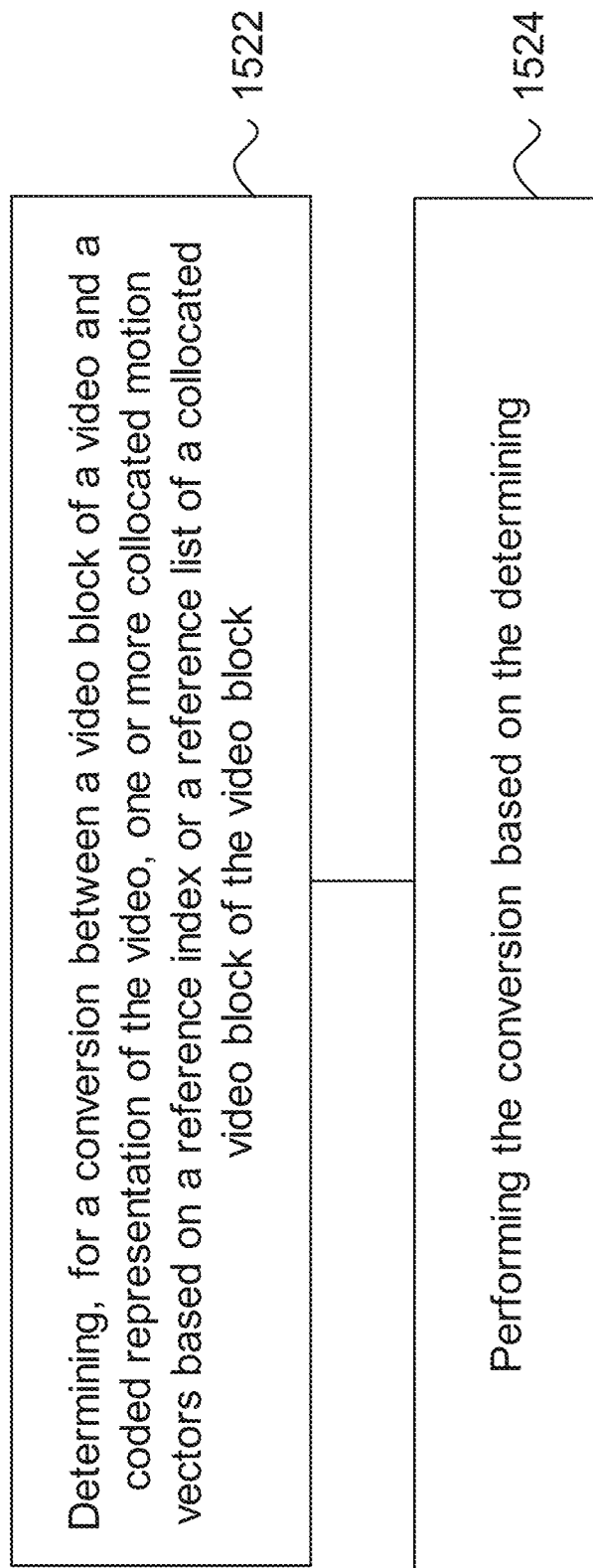

1. A method of video processing (e.g., method 1530 shown in FIG. 15C), comprising: deriving (1532), for a conversion between a current block of a video and a coded representation of the video, a prediction block for the current block that is determined according to a bi-directional coding unit level weighting (BCW) tool in which weights are used to determine a weighted sum of two initial prediction blocks used to determine the prediction block; and performing (1534) the conversion using the prediction block, wherein the deriving of the prediction block comprises: applying the weights to two intermediate prediction samples that respectively belong to the two initial prediction blocks to derive a final prediction sample; and performing a right shift operation for the final prediction sample to convert a bit depth of the final prediction sample, wherein the right shift operation is pbSample>> (shift1+3)), wherein pbSample represents the final prediction sample, shift1 is set equal to Max(2, 14−bitDepth); and determining the prediction block based on the final prediction sample.

2. The method of clause 1, wherein, before the performing the right shift operation, an offset is added to the final prediction sample.

3. The method of clause 1, wherein, the offset is 1<< (shift1+2).

4. The method of clause 3, wherein the final prediction sample, pbSamples[x][y], is derived such that pbSamples[x][y]=Clip3(0, (1<<bitDepth)−1, (w0*predSamplesL0[x][y]+w1*predSamplesL1[x][y]+offset3)>>(shift1+3)), wherein w0 and w1 are the weights, and predSamplesL0[x][y] and predSamplesL1[x][y] are the two intermediate prediction samples.

5. The method of clause 1, wherein at least one of the weights belongs to a weight table, wherein entries of the weight table are non-monotonically increasing.

6. A method of video processing, comprising: deriving, for a conversion between a current block of a video and a coded representation of the video, a prediction block for the current block that is determined according to a bi-directional coding unit level weighting (BCW) tool in which weights are used to determine a weighted sum of two initial prediction blocks used to determine the prediction block; and performing the conversion using the prediction block, wherein the deriving of the prediction block comprises: applying the weights to two intermediate prediction sample that respectively belong to the two initial prediction blocks to derive a final prediction sample; and adding an offset to the final prediction sample, wherein the offset is 1<<(shift1+2), wherein shift1 is set equal to Max(2, 14−bitDepth); and determining the prediction block based on the final prediction sample.

7. The method of clause 6, wherein the determining the prediction block based on the final prediction sample comprises: performing a right shift operation for the final prediction sample to convert a bit depth of the final prediction sample.

8. The method of clause 1 or 7, wherein the right shift operation is pbSample>>(shift1+3)), wherein pbSample represents the final prediction sample.

9. The method of clause 8, wherein the final prediction sample, pbSamples[x][y], is derived such that pbSamples[x][y]=Clip3(0, (1<<bitDepth)−1, (w0*predSamplesL0[x][y]+w1*predSamplesL1[x][y]+offset3)>>(shift1+3)), wherein wherein w0 and w1 are the weights, and predSamplesL0[x][y] and predSamplesL1[x][y] are the two intermediate prediction samples.

10. The method of clause 6, wherein at least one of the weights belongs to a weight table, wherein entries of the weight table are non-monotonically increasing.

Figure 15D:
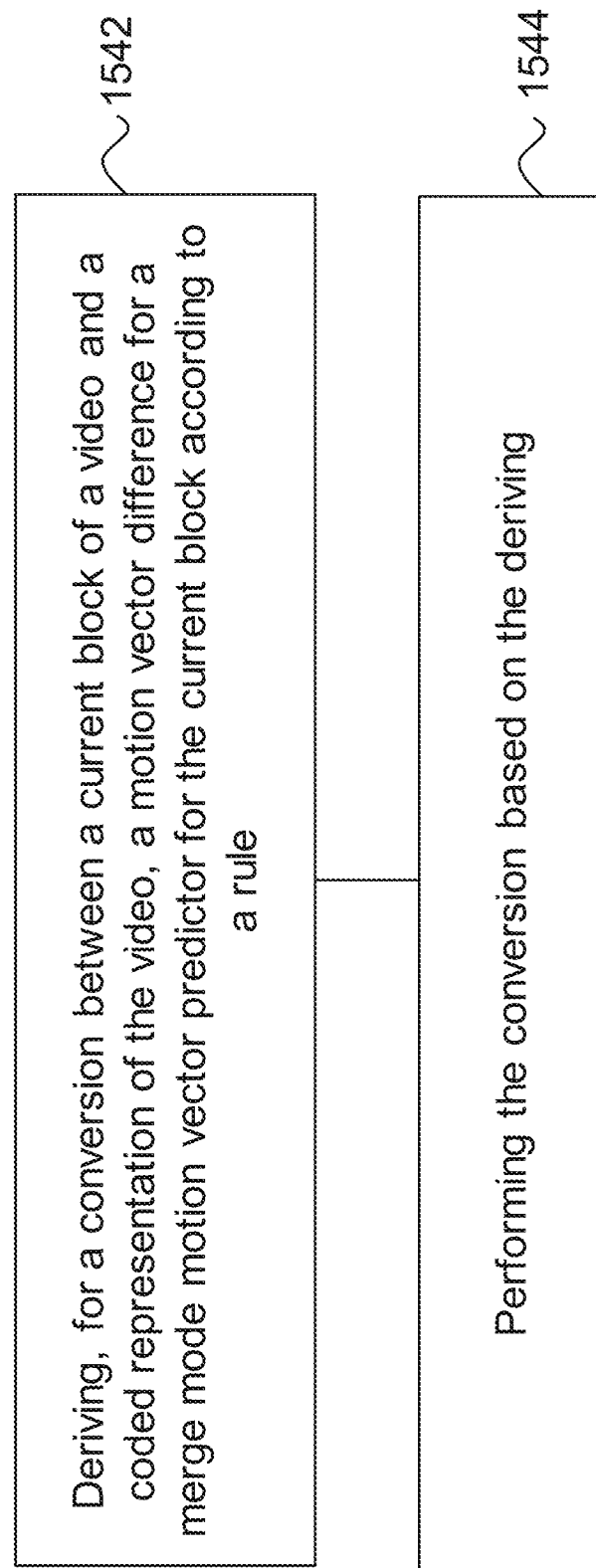

11. A method of video processing (e.g., method 1540 shown in FIG. 15D), comprising: deriving (1542), for a conversion between a current block of a video and a coded representation of the video, a motion vector difference for a merge mode motion vector predictor for the current block according to a rule; and performing (1544) the conversion based on the deriving, wherein the rule specifies whether to clip the motion vector difference to a same range as a range used for clipping motion vectors.

12. The method of clause 11, wherein the rule specifies that the motion vector difference is clipped to the same range as the range used for clipping motion vectors.

13. The method of clause 11, wherein the range used for clipping motion vectors is 18 bits.

14. The method of clause 13, wherein the range used for clipping motion vectors is $[-2^{17}, 2^{17}-1]$.

15. The method of clause 11, wherein the rule specifies that the motion vector difference is clipped to $[-2^{17}+1, 2^{17}-1]$.

16. The method of clause 11, wherein the rule specifies not to clip the motion vector difference.

17. The method of clause 16, wherein the rule specifies to clip a result obtained by adding the motion vector difference to a motion vector prediction candidate to 18 bits.

18. A method of video processing, comprising: deriving, for a conversion between a current block of a video and a coded representation of the video, a prediction block for the current block that is determined according to a bi-directional coding unit level weighting (BCW) tool in which weights are used to determine a weighted sum of two initial prediction blocks used to determine the prediction block, wherein at least one of the weights belongs to a weight table, wherein the weight table is organized according to a rule; and performing the conversion using the prediction block, wherein the rule specifies that entries of the weight table are non-monotonically increasing.

19. The method of clause 18, wherein the weight table includes an (i+1)th entry whose value is smaller than that of i-th entry.

20. A method of video processing, comprising: deriving, for a conversion between a current block of a video and a coded representation of the video, a prediction block for the current block that is determined according to a bi-directional coding unit level weighting (BCW) tool in which weights are used to determine a weighted sum of two initial prediction blocks used to determine the prediction block, wherein at least one of the weights belongs to a weight table, and the weight table is selected from multiple weight tables; and performing the conversion using the prediction block.

21. The method of clause 20, wherein the multiple weight tables include {4, 5, 3, 10, 2}, {4, 3, 5, 10, 2}, {4, 5, 3, 10, 1}, {4, 3, 5, 10, 1}, or {4, 5, 3, 10, −1}.

22. A method of video processing, comprising: deriving, for a conversion between a current block of a video and a coded representation of the video, a prediction block for the current block that is determined according to a bi-directional coding unit level weighting (BCW) tool in which weights are used to determine a weighted sum of two initial prediction blocks used to determine the prediction block; and performing the conversion using the prediction block, wherein the deriving of the prediction block comprises: converting an intermediate prediction sample to a first bit depth; applying the weights to the intermediate prediction sample to derive a final prediction sample; and converting the final prediction sample to a second bit depth.

23. The method of clause 22, wherein the second bit depth is a bit depth of a color component of the current block.

24. The method of clause 22, wherein the first bit depth is not equal to a bit depth of the intermediate prediction sample.

25. The method of clause 22, wherein the deriving of the prediction block comprises a right shift operation that converts a sample from a higher bit depth to a lower bit depth or left shift operation that converts the sample from the lower bit depth to the higher bit depth.

26. The method of clause 25, wherein an offset is added before the right shift operation or the left shift operation.

27. The method of clause 22, wherein the final prediction sample, pbSamples[x][y], is derived such that pbSamples[x][y]=Clip3(0, (1<<bitDepth)−1, (w0*((predSamplesL0[x][y]+offset1)>>shift1)+w1*((predSamplesL1[x][y]+offset1)>>shift1)+4)>>3), where w0 and w1 are the weights, shift1 is set equal to Max(2, 14−bitDepth) and offset1 is set equal to 1<<(shift1−1).

Figure 15E:
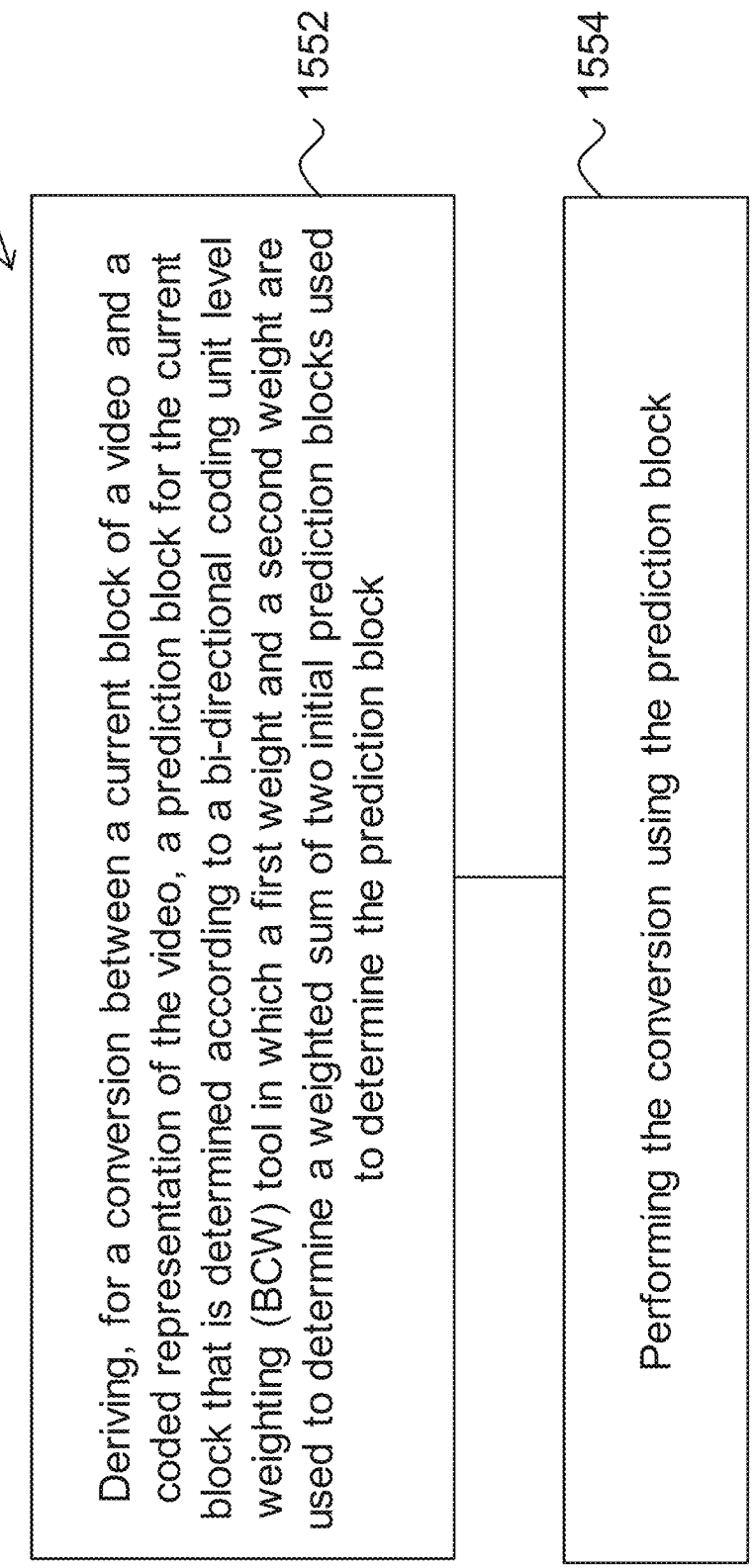

28. A method of video processing (method 1550 shown in FIG. 15E), comprising: deriving (1552), for a conversion between a current block of a video and a coded representation of the video, a prediction block for the current block that is determined according to a bi-directional coding unit level weighting (BCW) tool in which a first weight and a second weight are used to determine a weighted sum of two initial prediction blocks used to determine the prediction block, wherein at least one of the first weight and the second weight is included in a weight table, wherein the weight table is organized according to a rule; and performing the conversion using the prediction block, wherein the rule specifies that the weight table is asymmetric.

29. The method of clause 28, wherein the weight table includes an entry whose value corresponds to the first weight, W, and does not include any entry whose value corresponds to the second weight, (1−W), whereby W is in the range of [a, b] and a sum of a and b, (a+b), is equal to 1.

30. The method of clause 28, wherein the weight table includes an entry whose value corresponds to the first weight, W, and does not include any entry whose value corresponds to the second weight, ($2^N$−W), in case that a prediction sample is generated by (W0*P0+W1*P1)>>N, whereby W0 and W1 are the first weight and the second weight applied to the initial two prediction blocks P0 and P1, respectively; and (W0+W1) is equal to (1<<N).

31. The method of any of clauses 1 to 30, wherein the performing of the conversion includes generating the coded representation from the current video block.

32. The method of any of clauses 1 to 30, wherein the performing of the conversion includes generating the current video block from the coded representation.

33. A video processing apparatus comprising a processor configured to implement a method recited in any one or more of clauses 1 to 32.

34. A computer readable medium storing program code that, when executed, causes a processor to implement a method recited in any one or more of clauses 1 to 32.

35. A computer readable medium that stores a coded representation or a bitstream representation generated according to any of the above described methods.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   deriving, for a conversion between a current block of a video and a bitstream of the video, a prediction block for the current block that is determined according to a tool in which weights are used to determine a weighted sum of two initial prediction blocks used to determine the prediction block; and
   performing the conversion based on the prediction block, wherein the deriving of the prediction block comprises:
      applying weights to two intermediate prediction samples that are respectively in the two initial prediction blocks to derive a weighted prediction sample;
      performing a right shift operation on the weighted prediction sample, wherein a value of the right shift operation is (shift1+3), wherein shift1 is set equal to Max(2, 14−bitDepth), in which bitDepth represents a sample bit depth; and
      determining the prediction block based on the weighted prediction sample with the right shift operation,
   wherein the method further comprises:
   applying a format rule on the bitstream, wherein the format rule specifies a selective inclusion in the bitstream of an indication of a skip mode coding of the current block, wherein the skip mode coding allows to perform the conversion without generating or coding of a residual of the current block, and
   wherein the format rule specifies that the indication is included in the bitstream in a case that conditions are satisfied, and the conditions consist of:
   1) a slice type of a slice comprising the current block being not an I-slice, or a flag indicating whether an intra block copy (IBC) mode is enabled being set to true, wherein the flag indicating whether the intra block copy (IBC) mode is enabled represents as sps_ibc_enabled_flag, and
   2) the current block being not chroma component under dual tree partition structure, and
   3) i) a height and/or a width of the current block being not equal to 4 and ii) modeType of the current block being not MODE_TYPE_INTRA, or iii) the flag indicating whether the intra block copy (IBC) mode is enabled being set to true and the height and the width of the current block being less than or equal to 64;

wherein, before performing the right shift operation, an offset is added to the weighted prediction sample;

wherein, the offset is offset3=1<<(shift1+2);

wherein determining the prediction block based on the weighted prediction sample with the right shift operation comprises deriving a final prediction sample, in which pbSamples[x][y]=Clip3(0, (1<<bitDepth)−1, (w0*predSamplesL0[x][y]+w1*predSamplesL1[x][y]+offset3)>>(shift1+3)), wherein pbSamples[x][y] represents the final prediction sample, w0 and w1 are the weights, predSamplesL0[x][y] and predSamplesL1[x][y] are the two intermediate prediction samples, w0*predSamplesL0[x][y]+w1*predSamplesL1[x][y] represents the weighted prediction sample;

wherein the format rule specifies that the selective inclusion of the indication is independent of a flag indicating whether a palette mode is enabled, wherein the flag indicating whether the palette mode is enabled represents as sps_palette_enabled_flag.

2. The method of claim 1, wherein at least one of the weights belongs to a weight table, wherein values of weights in the weight table are non-monotonically increasing.

3. The method of claim 2, wherein the weight table includes an (i+1)th entry whose value is smaller than or equal to that of i-th entry.

4. The method of claim 1, wherein the tool is a bi-directional coding unit level weighting (BCW) tool.

5. The method of claim 1, wherein the right shift operation is performed for converting a bit depth of the weighted prediction sample.

6. The method of claim 1, wherein the conversion includes encoding the current block into the bitstream.

7. The method of claim 1, wherein the conversion includes decoding the current block from the bitstream.

8. An apparatus for processing video data comprising a processor and a non-transitory memory with instructions thereon, wherein the instructions upon execution by the processor, cause the processor to:

derive, for a conversion between a current block of a video and a bitstream of the video, a prediction block for the current block that is determined according to a tool in which weights are used to determine a weighted sum of two initial prediction blocks used to determine the prediction block; and perform the conversion based on the prediction block, wherein the deriving of the prediction block comprises:

applying weights to two intermediate prediction samples that respectively in the two initial prediction blocks to derive a weighted prediction sample;

performing a right shift operation on the weighted prediction sample, wherein a value of the right shift operation is (shift1+3), wherein shift1 is set equal to Max(2, 14−bitDepth), in which bitDepth represents a sample bit depth; and determining the prediction block based on the weighted prediction sample with the right shift operation, wherein the instructions further cause the processor to:

apply a format rule on the bitstream, wherein the format rule specifies a selective inclusion in the bitstream of an indication of a skip mode coding of the current block, wherein the skip mode coding allows to perform the conversion without generating or coding of a residual of the current block, and wherein the format rule specifies that the indication is included in the bitstream in a case that conditions are satisfied, and the conditions consist of:

1) a slice type of a slice comprising the current block being not an I-slice, or a flag indicating whether an intra block copy (IBC) mode is enabled being set to true, wherein the flag indicating whether the intra block copy (IBC) mode is enabled represents as sps_ibc_enabled_flag, and 2) the current block being not chroma component under dual tree partition structure, and 3) i) a height and/or a width of the current block being not equal to 4 and ii) modeType of the current block being not MODE_TYPE_INTRA, or iii) the flag indicating whether the intra block copy (IBC) mode is enabled being set to true and the height and the width of the current block being less than or equal to 64;

wherein, before performing the right shift operation, an offset is added to the weighted prediction sample;

wherein, the offset is offset3=1<<(shift1+2);

wherein determining the prediction block based on the weighted prediction sample with the right shift operation comprises deriving a final prediction sample, in which pbSamples[x][y]=Clip3(0, (1<<bitDepth)−1, (w0*predSamplesL0[x][y]+w1 *predSamplesL1 [x][y]+offset3)>>(shift1+3)), wherein pbSamples[x][y] represents the final prediction sample, w0 and w1 are the weights, predSamplesL0[x][y] and predSamplesL1[x][y] are the two intermediate prediction samples, w0*predSamplesL0[x][y]+w1*predSamplesL1[x][y] represents the weighted prediction sample;

wherein the format rule specifies that the selective inclusion of the indication is independent of a flag indicating whether a palette mode is enabled, wherein the flag indicating whether the palette mode is enabled represents as sps_palette_enabled_flag.

9. A non-transitory computer-readable storage medium storing instructions that cause a processor to:

derive, for a conversion between a current block of a video and a bitstream of the video, a prediction block for the current block that is determined according to a tool in which weights are used to determine a weighted sum of two initial prediction blocks used to determine the prediction block; and perform the conversion based on the prediction block, wherein the deriving of the prediction block comprises:

applying weights to two intermediate prediction samples that respectively in the two initial prediction blocks to derive a weighted prediction sample;

performing a right shift operation on the weighted prediction sample, wherein a value of the right shift operation is (shift1+3), wherein shift1 is set equal to Max(2, 14−bitDepth), in which bitDepth represents a sample bit depth; and determining the prediction block based on the weighted prediction sample with the right shift operation, wherein the instructions further cause the processor to:

apply a format rule on the bitstream, wherein the format rule specifies a selective inclusion in the bitstream of an indication of a skip mode coding of the current block, wherein the skip mode coding allows to perform the conversion without generating or coding of a residual of the current block, and wherein the format rule specifies that the indication is included in the bitstream in a case that conditions are satisfied, and the conditions consist of:
1) a slice type of a slice comprising the current block being not an I-slice, or a flag indicating whether an intra block copy (IBC) mode is enabled being set to true, wherein the flag indicating whether the intra block copy (IBC) mode is enabled represents as sps_ibc_enabled_flag, and
2) the current block being not chroma component under dual tree partition structure, and
3) i) a height and/or a width of the current block being not equal to 4 and ii) modeType of the current block being not MODE_TYPE_INTRA, or iii) the flag indicating whether the intra block copy (IBC) mode is enabled being set to true and the height and the width of the current block being less than or equal to 64;

wherein, before performing the right shift operation, an offset is added to the weighted prediction sample;

wherein, the offset is offset3=1<<(shift1+2);

wherein determining the prediction block based on the weighted prediction sample with the right shift operation comprises deriving a final prediction sample, in which pbSamples[x][y]=Clip3(0, (1<<bitDepth)−1, (w0*predSamplesL0[x][y]+w1*predSamplesL1[x][y]+offset3)>>(shift1+3)), wherein pbSamples[x][y] represents the final prediction sample, w0 and w1 are the weights, predSamplesL0[x][y] and predSamplesL1[x][y] are the two intermediate prediction samples, w0*predSamplesL0[x][y]+w1*predSamplesL1[x][y] represents the weighted prediction sample;

wherein the format rule specifies that the selective inclusion of the indication is independent of a flag indicating whether a palette mode is enabled, wherein the flag indicating whether the palette mode is enabled represents as sps_palette_enabled_flag.

10. A method for storing a bitstream of a video, comprising:
deriving, for a current block of a video, a prediction block for the current block that is determined according to a tool in which weights are used to determine a weighted sum of two initial prediction blocks used to determine the prediction block;
generating the bitstream based on the prediction block, and
storing the bitstream to a non-transitory computer-readable recording medium;
wherein the deriving of the prediction block comprises:
applying weights to two intermediate prediction samples that respectively in the two initial prediction blocks to derive a weighted prediction sample;
performing a right shift operation on the weighted prediction sample, wherein a value of the right shift operation is (shift1+3), wherein shift1 is set equal to Max(2, 14−bitDepth), in which bitDepth represents a sample bit depth; and
determining the prediction block based on the weighted prediction sample with the right shift operation,
wherein the method further comprises:
applying a format rule on the bitstream, wherein the format rule specifies a selective inclusion in the bitstream of an indication of a skip mode coding of the current block, wherein the skip mode coding allows to perform the generating of the bitstream without generating or coding of a residual of the current block, and wherein the format rule specifies that the indication is included in the bitstream in a case that conditions are satisfied, and the conditions consist of:
1) a slice type of a slice comprising the current block being not an I-slice, or a flag indicating whether an intra block copy (IBC) mode is enabled being set to true, wherein the flag indicating whether the intra block copy (IBC) mode is enabled represents as sps_ibc_enabled_flag, and
2) the current block being not chroma component under dual tree partition structure, and
3) i) a height and/or a width of the current block being not equal to 4 and ii) modeType of the current block being not MODE_TYPE_INTRA, or iii) the flag indicating whether the intra block copy (IBC) mode is enabled being set to true and the height and the width of the current block being less than or equal to 64;

wherein, before performing the right shift operation, an offset is added to the weighted prediction sample;

wherein, the offset is offset3=1<<(shift1+2);

wherein determining the prediction block based on the weighted prediction sample with the right shift operation comprises deriving a final prediction sample, in which pbSamples[x][y]=Clip3(0, (1<<bitDepth)−1, (w0*predSamplesL0[x][y]+w1*predSamplesL1[x][y]+offset3)>>(shift1+3)), wherein pbSamples[x][y] represents the final prediction sample, w0 and w1 are the weights, predSamplesL0[x][y] and predSamplesL1[x][y] are the two intermediate prediction samples, w0*predSamplesL0[x][y]+w1*predSamplesL1[x][y] represents the weighted prediction sample;

wherein the format rule specifies that the selective inclusion of the indication is independent of a flag indicating whether a palette mode is enabled, wherein the flag indicating whether the palette mode is enabled represents as sps_palette_enabled_flag.

11. The apparatus of claim 8, wherein at least one of the weights belongs to a weight table, wherein values of weights in the weight table are non-monotonically increasing.

12. The apparatus of claim 11, wherein the weight table includes an (i+1)th entry whose value is smaller than or equal to that of i-th entry.

13. The apparatus of claim 8, wherein the tool is a bi-directional coding unit level weighting (BCW) tool.

14. The apparatus of claim 8, wherein the right shift operation is performed for converting a bit depth of the weighted prediction sample.

15. The apparatus of claim 8, wherein the conversion includes encoding the current block into the bitstream.

16. The apparatus of claim 8, wherein the conversion includes decoding the current block from the bitstream.

17. The non-transitory computer-readable storage medium of claim 9, wherein at least one of the weights belongs to a weight table, wherein values of weights in the weight table are non-monotonically increasing.

18. The non-transitory computer-readable storage medium of claim 17, wherein the weight table includes an (i+1)th entry whose value is smaller than or equal to that of i-th entry.

19. The non-transitory computer-readable storage medium of claim 9, wherein the tool is a bi-directional coding unit level weighting (BCW) tool.

20. The non-transitory computer-readable storage medium of claim 9, wherein the right shift operation is performed for converting a bit depth of the weighted prediction sample.

* * * * *